(12) United States Patent
Jung et al.

(10) Patent No.: US 9,838,536 B2
(45) Date of Patent: Dec. 5, 2017

(54) MOBILE DEVICE SHARING FACILITATION METHODS AND SYSTEMS

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha, LLC, Bellevue, WA (US)

( * ) Notice: Subject to any disclaimer, the term of this patent is extended or adjusted under 35 U.S.C. 154(b) by 0 days.

(21) Appl. No.: 14/042,192

(22) Filed: Sep. 30, 2013

(65) Prior Publication Data

US 2015/0094035 A1  Apr. 2, 2015

(51) Int. Cl.
*H04M 3/42* (2006.01)
*H04W 4/16* (2009.01)

(52) U.S. Cl.
CPC ... *H04M 3/42102* (2013.01); *H04M 3/42042* (2013.01); *H04M 2203/154* (2013.01); *H04M 2250/04* (2013.01); *H04W 4/16* (2013.01)

(58) Field of Classification Search
None
See application file for complete search history.

(56) References Cited

U.S. PATENT DOCUMENTS

| | | |
|---|---|---|
| 5,867,788 A | 2/1999 | Joensuu |
| 6,134,014 A | 10/2000 | Tzu et al. |
| 6,167,398 A | 12/2000 | Wyard et al. |
| 6,424,729 B1 | 7/2002 | Soon |
| 6,788,927 B2 | 9/2004 | Pohutsky et al. |
| 6,978,156 B1 | 12/2005 | Papadopoulos et al. |
| 7,093,145 B2 | 8/2006 | Werner et al. |
| 7,135,889 B2 | 11/2006 | Hairapetian |
| 7,161,513 B2 | 1/2007 | Werner et al. |
| 7,245,913 B1 | 7/2007 | Nguyen et al. |
| 7,254,123 B2 | 8/2007 | Jukarainen |
| 7,260,203 B2 | 8/2007 | Holt et al. |
| 7,305,079 B1 | 12/2007 | Forte |
| 7,321,239 B2 | 1/2008 | Hedberg et al. |
| 7,344,063 B2 | 3/2008 | Wagner et al. |
| 7,353,016 B2 | 4/2008 | Roundtree et al. |
| 7,362,768 B1 | 4/2008 | Dommety |
| 7,373,384 B2 | 5/2008 | Bragado Carrasco et al. |
| 7,392,017 B2 | 6/2008 | Chu et al. |
| 7,398,524 B2 | 7/2008 | Shapiro |
| 7,421,477 B2 | 9/2008 | Pettinato |
| 7,443,787 B2 | 10/2008 | Karino et al. |

(Continued)

FOREIGN PATENT DOCUMENTS

WO  WO 2014/088529 A1  6/2014

OTHER PUBLICATIONS

Evans, Keith; "How to Spoof a Caller ID"; eHow; Printed on Jan. 7, 2014; pp. 1-4; Demand Media, Inc.; located at http://www.ehow.com/how_5128156_spoof-caller-id.html.

(Continued)

*Primary Examiner* — Moustapha Diaby

(57) ABSTRACT

Structures and protocols are presented for signaling a status or decision concerning a wireless service or device within a region to a network participant or other communication device (smartphone or vehicle, e.g.).

20 Claims, 25 Drawing Sheets

(56) References Cited

U.S. PATENT DOCUMENTS

| | | |
|---|---|---|
| 7,516,092 B2 | 4/2009 | Upendran et al. |
| 7,519,373 B2 | 4/2009 | Kennedy, Jr. et al. |
| 7,522,992 B2 | 4/2009 | Obradovich et al. |
| 7,535,749 B2 | 5/2009 | Lines |
| 7,567,305 B2 | 7/2009 | Joo |
| 7,593,812 B2 | 9/2009 | Obradovich et al. |
| 7,644,055 B2 | 1/2010 | Furst et al. |
| 7,646,712 B2 | 1/2010 | Cohen et al. |
| 7,650,319 B2 | 1/2010 | Hoffberg et al. |
| 7,664,720 B1 | 2/2010 | Freeman et al. |
| 7,693,137 B2 | 4/2010 | Gardell et al. |
| 7,693,752 B2 | 4/2010 | Jaramillo |
| 7,698,256 B1 | 4/2010 | Wang |
| 7,743,334 B2 | 6/2010 | Rider |
| 7,761,505 B2 | 7/2010 | Krzyzanowski et al. |
| 7,761,591 B2 | 7/2010 | Graham |
| 7,787,693 B2 | 8/2010 | Siegemund |
| 7,787,896 B2 | 8/2010 | Kundu et al. |
| 7,813,716 B2 | 10/2010 | Malackowski et al. |
| 7,831,559 B1 | 11/2010 | Mohan et al. |
| 7,835,314 B2 | 11/2010 | Yee et al. |
| 7,835,751 B2 | 11/2010 | Ibe et al. |
| 7,844,684 B2 | 11/2010 | Pettinato |
| 7,853,268 B2 | 12/2010 | Karaoguz et al. |
| 7,856,137 B2 | 12/2010 | Yonezawa et al. |
| 7,860,648 B2 | 12/2010 | Jung et al. |
| 7,881,992 B1 | 2/2011 | Seaman et al. |
| 7,885,395 B2 | 2/2011 | Cadiz et al. |
| 7,908,518 B2 | 3/2011 | West, Jr. et al. |
| 7,925,250 B2 | 4/2011 | Redpath |
| 7,949,191 B1 | 5/2011 | Ramkumar et al. |
| 7,961,076 B2 | 6/2011 | Kelley et al. |
| 7,965,997 B2 | 6/2011 | Sposato et al. |
| 8,000,455 B1 | 8/2011 | Van Haaften et al. |
| 8,000,528 B2 | 8/2011 | Ming et al. |
| 8,004,083 B2 | 8/2011 | Lin et al. |
| 8,004,556 B2 | 8/2011 | Rodman et al. |
| 8,005,911 B2 | 8/2011 | Jhanji |
| 8,010,230 B2 | 8/2011 | Zini et al. |
| 8,010,663 B2 | 8/2011 | Firminger et al. |
| 8,023,314 B2 | 9/2011 | Lines |
| 8,032,149 B2 | 10/2011 | Kennedy et al. |
| 8,037,126 B2 | 10/2011 | Plamondon |
| 8,045,957 B2 | 10/2011 | Dinh et al. |
| 8,049,664 B2 | 11/2011 | Millard et al. |
| 8,054,856 B2 | 11/2011 | Sala et al. |
| 8,059,011 B2 | 11/2011 | Van Wyk et al. |
| 8,059,788 B2 | 11/2011 | Allen, Jr. et al. |
| 8,060,109 B2 | 11/2011 | Fomukong et al. |
| 8,068,836 B2 | 11/2011 | Voyer et al. |
| 8,086,239 B2 | 12/2011 | Elmaleh |
| 8,098,753 B2 | 1/2012 | Feher |
| 8,108,501 B2 | 1/2012 | Birnie et al. |
| 8,108,903 B2 | 1/2012 | Norefors et al. |
| 8,111,622 B2 | 2/2012 | Cohen et al. |
| 8,125,896 B2 | 2/2012 | Cohen et al. |
| 8,128,501 B2 | 3/2012 | Theimer et al. |
| 8,139,564 B1 | 3/2012 | Weaver et al. |
| 8,145,566 B1 | 3/2012 | Ahuja et al. |
| 8,145,975 B2 | 3/2012 | Lin et al. |
| 8,160,304 B2 | 4/2012 | Rhoads et al. |
| 8,165,091 B2 | 4/2012 | Nix |
| 8,166,524 B2 | 4/2012 | Sentinelli |
| 8,169,311 B1 | 5/2012 | Breed |
| 8,170,549 B1 | 5/2012 | McCorkendale et al. |
| 8,184,580 B2 | 5/2012 | Wilhelmsson et al. |
| 8,184,656 B2 | 5/2012 | Chandra et al. |
| 8,195,198 B1 | 6/2012 | Shaw et al. |
| 8,195,478 B2 | 6/2012 | Petersen et al. |
| 8,200,243 B1 | 6/2012 | Feher |
| 8,208,489 B2 | 6/2012 | Hong et al. |
| 8,219,312 B2 | 7/2012 | Davidson et al. |
| 8,223,694 B2 | 7/2012 | Jayapalan et al. |
| 8,224,349 B2 | 7/2012 | Meredith et al. |
| 8,233,471 B2 | 7/2012 | Brownrigg et al. |
| 8,234,523 B2 | 7/2012 | Bharadwaj et al. |
| 8,238,869 B2 | 8/2012 | Brayton |
| 8,243,887 B2 | 8/2012 | Conahan |
| 8,244,228 B1 | 8/2012 | Sutardja |
| 8,248,968 B2 | 8/2012 | Handforth et al. |
| 8,249,256 B2 | 8/2012 | Korus et al. |
| 8,249,616 B2 | 8/2012 | Boejer et al. |
| 8,259,822 B1 | 9/2012 | Feher |
| 8,260,896 B2 | 9/2012 | Trevino et al. |
| 8,261,090 B1 | 9/2012 | Matsuoka |
| 8,264,953 B2 | 9/2012 | Licardie et al. |
| 8,265,655 B2 | 9/2012 | Khushu |
| 8,266,313 B2 | 9/2012 | Pettinato |
| 8,271,626 B2 | 9/2012 | Childers et al. |
| 8,280,913 B2 | 10/2012 | Bergin |
| 8,284,100 B2 | 10/2012 | Vartanian et al. |
| 8,289,210 B2 | 10/2012 | Thomson et al. |
| 8,290,509 B2 | 10/2012 | Jung et al. |
| 8,295,352 B2 | 10/2012 | Leprovost et al. |
| 8,295,395 B2 | 10/2012 | Mueck et al. |
| 8,301,375 B2 | 10/2012 | Chiayee et al. |
| 8,301,564 B2 | 10/2012 | Mon et al. |
| 8,306,005 B1 | 11/2012 | Gurin |
| 8,311,509 B2 | 11/2012 | Feher |
| 8,311,513 B1 | 11/2012 | Nasserbakht et al. |
| 8,311,532 B2 | 11/2012 | Waller |
| 8,311,579 B2 | 11/2012 | Rofougaran et al. |
| 8,315,622 B2 | 11/2012 | Rofougaran |
| 8,316,394 B2 | 11/2012 | Yates |
| 8,320,261 B2 | 11/2012 | Vasamsetti et al. |
| 8,320,494 B2 | 11/2012 | Zerbe et al. |
| 8,321,591 B2 | 11/2012 | Farchmin et al. |
| 8,321,727 B2 | 11/2012 | D'Abreu et al. |
| 8,325,901 B1 | 12/2012 | Dolan et al. |
| 8,341,246 B2 | 12/2012 | LaJoie et al. |
| 8,346,282 B1 | 1/2013 | Dronamraju et al. |
| 8,346,879 B2 | 1/2013 | Meunier et al. |
| 8,352,872 B2 | 1/2013 | Fish |
| 8,358,975 B2 | 1/2013 | Bahl et al. |
| 8,369,311 B1 | 2/2013 | Kirchhoff et al. |
| 8,369,871 B1 | 2/2013 | Izdepski et al. |
| 8,370,349 B2 | 2/2013 | Quoc et al. |
| 8,380,188 B2 | 2/2013 | Ramachandra Rao et al. |
| 8,385,224 B2 | 2/2013 | Pasko |
| 8,391,930 B1 | 3/2013 | Delker et al. |
| 8,395,223 B2 | 3/2013 | Yang |
| 8,406,753 B2 | 3/2013 | Alles et al. |
| 8,410,898 B1 | 4/2013 | Vasquez |
| 8,412,946 B2 | 4/2013 | Savitzky et al. |
| 8,427,910 B2 | 4/2013 | Verbakel et al. |
| 8,428,645 B2 | 4/2013 | Rao |
| 8,433,764 B2 | 4/2013 | Rideout et al. |
| 8,443,420 B2 | 5/2013 | Brown et al. |
| 8,447,352 B2 | 5/2013 | Forte |
| 8,467,354 B1 | 6/2013 | Jerkunica et al. |
| 8,488,596 B2 | 7/2013 | Parlamas et al. |
| 8,498,269 B2 | 7/2013 | Nix |
| 8,526,929 B1 | 9/2013 | Gilbert et al. |
| 8,528,810 B1 | 9/2013 | Rojas et al. |
| 8,543,397 B1 | 9/2013 | Nguyen |
| 8,548,151 B1 | 10/2013 | Dianda |
| 8,548,447 B1 | 10/2013 | Kirchhoff et al. |
| 8,583,107 B2 | 11/2013 | Chintada et al. |
| 8,595,108 B2 | 11/2013 | Nuzzi et al. |
| 8,599,873 B2 | 12/2013 | Barzegar et al. |
| 8,606,655 B2 | 12/2013 | Allen et al. |
| 8,610,675 B2 | 12/2013 | Lipman et al. |
| 8,611,209 B2 | 12/2013 | Berg et al. |
| 8,615,008 B2 | 12/2013 | Natarajan et al. |
| 8,618,835 B2 | 12/2013 | Catli et al. |
| 8,619,569 B2 | 12/2013 | Godor et al. |
| 8,693,655 B2 | 4/2014 | Chau et al. |
| 9,088,877 B1 | 7/2015 | Hagendorf |
| 2002/0037715 A1 | 3/2002 | Mauney et al. |
| 2002/0077102 A1* | 6/2002 | Achuthan .............. H04M 1/575 455/567 |
| 2002/0198007 A1* | 12/2002 | Zimmerman .................. 455/458 |
| 2003/0012345 A1 | 1/2003 | Marsh et al. |
| 2003/0139192 A1 | 7/2003 | Chmaytelli et al. |

(56) References Cited

U.S. PATENT DOCUMENTS

| | | |
|---|---|---|
| 2003/0179743 A1 | 9/2003 | Bosik et al. |
| 2005/0053241 A1 | 3/2005 | Fan et al. |
| 2005/0080897 A1 | 4/2005 | Braun et al. |
| 2005/0107121 A1 | 5/2005 | Gamble |
| 2005/0190902 A1 | 9/2005 | Benco et al. |
| 2005/0215241 A1 | 9/2005 | Okada |
| 2006/0019630 A1 | 1/2006 | Sposato et al. |
| 2006/0059305 A1 | 3/2006 | Fisher et al. |
| 2006/0078122 A1* | 4/2006 | Dacosta ............. H04L 63/0492 380/258 |
| 2006/0121894 A1 | 6/2006 | Ganesan |
| 2006/0140200 A1 | 6/2006 | Black et al. |
| 2006/0264234 A1* | 11/2006 | Akama ..................... 455/556.1 |
| 2007/0054674 A1 | 3/2007 | Cohen et al. |
| 2007/0082705 A1* | 4/2007 | Jain et al. ................... 455/558 |
| 2007/0105531 A1* | 5/2007 | Schroeder ......... H04M 3/42008 455/411 |
| 2007/0116016 A1 | 5/2007 | Cohen et al. |
| 2007/0117585 A1* | 5/2007 | Juneja ..................... H04L 63/08 455/550.1 |
| 2007/0133472 A1 | 6/2007 | Kim et al. |
| 2007/0176742 A1 | 8/2007 | Hofmann et al. |
| 2007/0189496 A1* | 8/2007 | Kahn ............................. 379/350 |
| 2007/0202883 A1 | 8/2007 | Herve et al. |
| 2007/0237101 A1 | 10/2007 | Cohen et al. |
| 2007/0259678 A1 | 11/2007 | Kuk et al. |
| 2007/0264981 A1* | 11/2007 | Miller ................... H04W 48/18 455/414.1 |
| 2007/0270122 A1* | 11/2007 | Ewell ..................... H04M 1/66 455/404.2 |
| 2008/0102843 A1* | 5/2008 | Todd et al. .................... 455/445 |
| 2008/0113687 A1 | 5/2008 | Prendergast et al. |
| 2008/0115225 A1 | 5/2008 | Jogand-Coulomb et al. |
| 2008/0132201 A1 | 6/2008 | Karlberg |
| 2008/0167045 A1 | 7/2008 | Lee et al. |
| 2008/0175223 A1 | 7/2008 | Croak et al. |
| 2008/0256201 A1 | 10/2008 | Flowers et al. |
| 2008/0280589 A1 | 11/2008 | Cowper et al. |
| 2009/0028318 A1 | 1/2009 | Bhogal et al. |
| 2009/0061932 A1 | 3/2009 | Nagarajan |
| 2009/0064346 A1 | 3/2009 | Larsson et al. |
| 2009/0068980 A1 | 3/2009 | Creswell et al. |
| 2009/0089055 A1 | 4/2009 | Caspi et al. |
| 2009/0154674 A1 | 6/2009 | Chu |
| 2009/0212908 A1 | 8/2009 | Lin et al. |
| 2009/0227229 A1 | 9/2009 | Waller |
| 2010/0023519 A1 | 1/2010 | Kailash et al. |
| 2010/0046459 A1* | 2/2010 | Nishio et al. .................. 370/329 |
| 2010/0128857 A1* | 5/2010 | Logan ......................... 379/88.22 |
| 2010/0205667 A1 | 8/2010 | Anderson et al. |
| 2010/0210304 A1* | 8/2010 | Huslak ................... G06Q 10/10 455/558 |
| 2010/0330987 A1 | 12/2010 | Lee |
| 2011/0053574 A1* | 3/2011 | Rice ....................... H04M 1/006 455/418 |
| 2011/0055255 A1 | 3/2011 | Shaw et al. |
| 2011/0086670 A1 | 4/2011 | Shin |
| 2011/0106857 A1 | 5/2011 | Besombe et al. |
| 2011/0130168 A1 | 6/2011 | Vendrow et al. |
| 2011/0191205 A1 | 8/2011 | Enmei |
| 2011/0222395 A1 | 9/2011 | Ham et al. |
| 2011/0258303 A1 | 10/2011 | Nath et al. |
| 2011/0292923 A1 | 12/2011 | Noldus |
| 2011/0316671 A1 | 12/2011 | Yaguchi et al. |
| 2012/0076137 A1 | 3/2012 | Weaver et al. |
| 2012/0077467 A1 | 3/2012 | Fan et al. |
| 2012/0115493 A1 | 5/2012 | Matada et al. |
| 2012/0115546 A1 | 5/2012 | Lin et al. |
| 2012/0135715 A1 | 5/2012 | Kang et al. |
| 2012/0149435 A1 | 6/2012 | Jang et al. |
| 2012/0157040 A1 | 6/2012 | Naito et al. |
| 2012/0163566 A1 | 6/2012 | Gravino et al. |
| 2012/0178500 A1 | 7/2012 | Hwang |
| 2012/0202454 A1 | 8/2012 | Smith et al. |
| 2012/0250586 A1 | 10/2012 | Ahmavaara |
| 2012/0254983 A1 | 10/2012 | Levien et al. |
| 2012/0282903 A1 | 11/2012 | Rabra et al. |
| 2012/0314860 A1 | 12/2012 | Liu et al. |
| 2012/0317261 A1 | 12/2012 | Ahmavaara |
| 2013/0053010 A1 | 2/2013 | Kim |
| 2013/0065526 A1 | 3/2013 | Pottier et al. |
| 2013/0065570 A1 | 3/2013 | Jung et al. |
| 2013/0080560 A1 | 3/2013 | Sayankar et al. |
| 2013/0091564 A1 | 4/2013 | Fitzgerald et al. |
| 2013/0094452 A1 | 4/2013 | Pavlovski et al. |
| 2013/0095784 A1 | 4/2013 | Jerath et al. |
| 2013/0106682 A1 | 5/2013 | Davis et al. |
| 2013/0117214 A1 | 5/2013 | Davis et al. |
| 2013/0122862 A1* | 5/2013 | Horn et al. .................... 455/411 |
| 2013/0124619 A1 | 5/2013 | Steakley |
| 2013/0132854 A1 | 5/2013 | Raleigh et al. |
| 2013/0150111 A1 | 6/2013 | Su et al. |
| 2013/0151385 A1 | 6/2013 | McGuire |
| 2013/0151728 A1 | 6/2013 | Currier |
| 2013/0159499 A1 | 6/2013 | Besehanic |
| 2013/0160141 A1 | 6/2013 | Tseng et al. |
| 2013/0174223 A1 | 7/2013 | Dykeman et al. |
| 2013/0278622 A1 | 10/2013 | Sun et al. |
| 2013/0281054 A1 | 10/2013 | Ye et al. |
| 2013/0288747 A1 | 10/2013 | Shu |
| 2013/0294443 A1 | 11/2013 | Kahn |
| 2013/0304850 A1 | 11/2013 | Mahaffey et al. |
| 2013/0305163 A1 | 11/2013 | Farmer et al. |
| 2013/0305359 A1 | 11/2013 | Gathala et al. |
| 2013/0344855 A1 | 12/2013 | Li et al. |
| 2014/0007187 A1 | 1/2014 | Harrison |
| 2014/0024353 A1 | 1/2014 | Baek et al. |
| 2014/0024361 A1 | 1/2014 | Poon et al. |
| 2014/0057597 A1 | 2/2014 | Velusamy et al. |
| 2014/0064467 A1 | 3/2014 | Lawson et al. |
| 2014/0065997 A1* | 3/2014 | Walker ................... H04W 4/02 455/404.1 |
| 2014/0106710 A1 | 4/2014 | Rodriguez |
| 2014/0115492 A1 | 4/2014 | Tehranchi et al. |
| 2014/0123228 A1 | 5/2014 | Brill et al. |
| 2014/0126532 A1 | 5/2014 | Bapat et al. |
| 2014/0155118 A1 | 6/2014 | Tsuda |
| 2014/0156545 A1 | 6/2014 | Clapham et al. |
| 2014/0250505 A1 | 9/2014 | Kim et al. |
| 2014/0274047 A1 | 9/2014 | Dhanda et al. |
| 2014/0295831 A1 | 10/2014 | Karra et al. |
| 2015/0018040 A1 | 1/2015 | He et al. |
| 2015/0079965 A1 | 3/2015 | Mullins |
| 2015/0281926 A1 | 10/2015 | Liu et al. |
| 2015/0312876 A1 | 10/2015 | Syrjärinne et al. |
| 2016/0021248 A1 | 1/2016 | Backhaus et al. |

OTHER PUBLICATIONS

Google; "About Google Voice"; Google Voice Help; 2014; Printed on Jan. 7, 2014; pp. 1-3; located at https://support.google.com/voice/answer/115061.

Google; "About the Google Voice Account types"; Google Voice Help; 2014; Printed on Jan. 7, 2014; pp. 1-4; located at https://support.google.com/voice/answer/115073.

Google; "Call forwarding with your Google number"; Google Voice Help; 2014; Printed on Jan. 7, 2014; pp. 1-2; located at https://support.google.com/voice/answer/165221.

Google; "Configure Google Voice"; Google Voice Help; 2014; Printed on Jan. 7, 2014; pp. 1-2; located at https://support.google.com/voice/answer/168519.

Google; "Customize voicemail greetings and settings"; Google Voice Help; 2014; Printed on Jan. 7, 2014; pp. 1-3; located at https://support.google.com/voice/answer/115069.

Google; "Make a call"; Google Voice Help; 2014; Printed on Jan. 7, 2014; pp. 1-3; located at https://support google.com/voice/answer/173154.

Google; "Send text messages"; Google Voice Help; 2014; Printed on Jan. 7, 2014; pp. 1-2; located at https://support.google.com/voice/answer/173156.

(56) References Cited

OTHER PUBLICATIONS

Google; "Settings"; Google Voice Help; 2014; Printed on Jan. 7, 2014; pp. 1-2; located at https://support.google.com/voice/answer/168521.
Google; "Settings"; Google Voice Help; 2014; Printed on Jan. 7, 2014; pp. 1-2; located at https://support.google.com/voice/answer/173160.
Google; "Sharing a forwarding phone number"; Google Voice Help; 2014; Printed on Jan. 7, 2014; pp. 1-2; located at https://support.google./com/voice/answer/115105.
Google; "Temporary call forwarding"; Google Voice Help; 2014; Printed on Jan. 7, 2014; pp. 1-2; located at https://support.google.com/voice/answer/115084.
Truecaller; "How it works"; Printed on Jan. 7, 2014; pp. 1-6; True Software Scandinavia AB; located at http://www.truecaller.com/how-it-works.
PCT International Search Report; International App. No. PCT/US2014/058252; dated Jan. 8, 2015; pp. 1-4.
PCT International Search Report; International App. No. PCT/US2014/058248; dated Jan. 9, 2015; pp. 1-4.
U.S. Appl. No. 13/954,756, Hyde et al.
Google; "What's new in Google Voice"; Google Voice; 2011; Printed on Aug. 29, 2013; pp. 1-5; located at www.google.com/googlevoice/whatsnew.html.
Kozierok, Charles M.; "IP Datagram General Format"; The TCP/IP Guide; Version date Sep. 20, 2005; Printed on Sep. 5, 2013; pp. 1-5; located at www.tcpipguide.com/free/t_IPDatagramGeneralFormat.htm.
"Learn English Online"; English Grammar—Clauses—Learn English; bearing a date of Sep. 12, 2016; pp. 1-4; Copyright 1999-2016 Learn English Network; located at: http://www.learingenglish.de/grammar/clausetext.html) (as provided by examiner).
"Learner's Dictionary mobile search"; Merriam-Webster; bearing a date of Sep. 12, 2016; 1 page; located at: http://www.learnersdictionary.com/ (as provided by examiner).

\* cited by examiner

FIG. 3

| Fig. 3-A | Fig. 3-B | Fig. 3-C |
|---|---|---|
| Fig. 3-D | Fig. 3-E | Fig. 3-F |
| Fig. 3-G | Fig. 3-H | Fig. 3-I |
| Fig. 3-J | Fig. 3-K | Fig. 3-L |
| Fig. 3-M | Fig. 3-N | Fig. 3-O |

Fig. 3-A

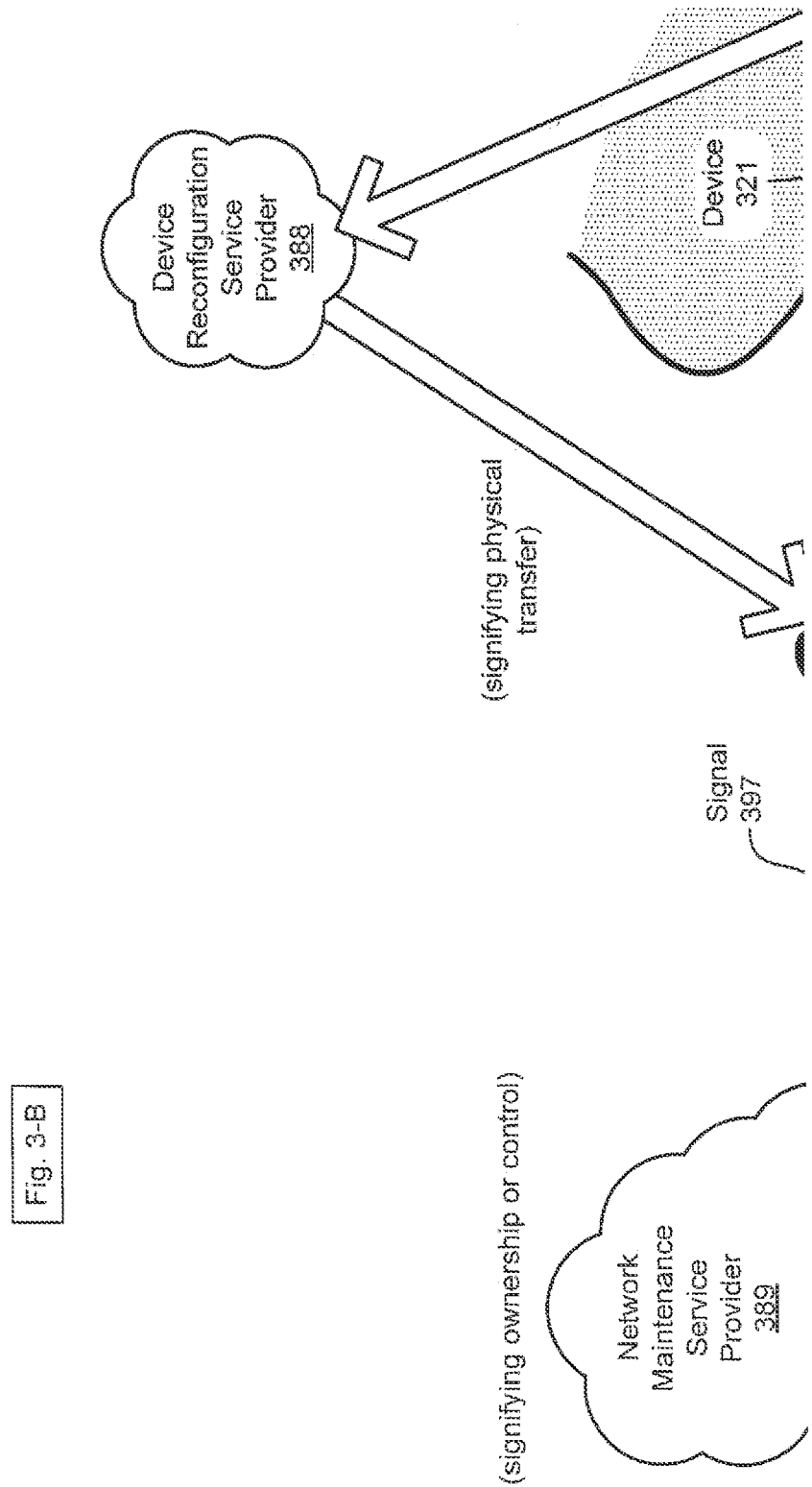

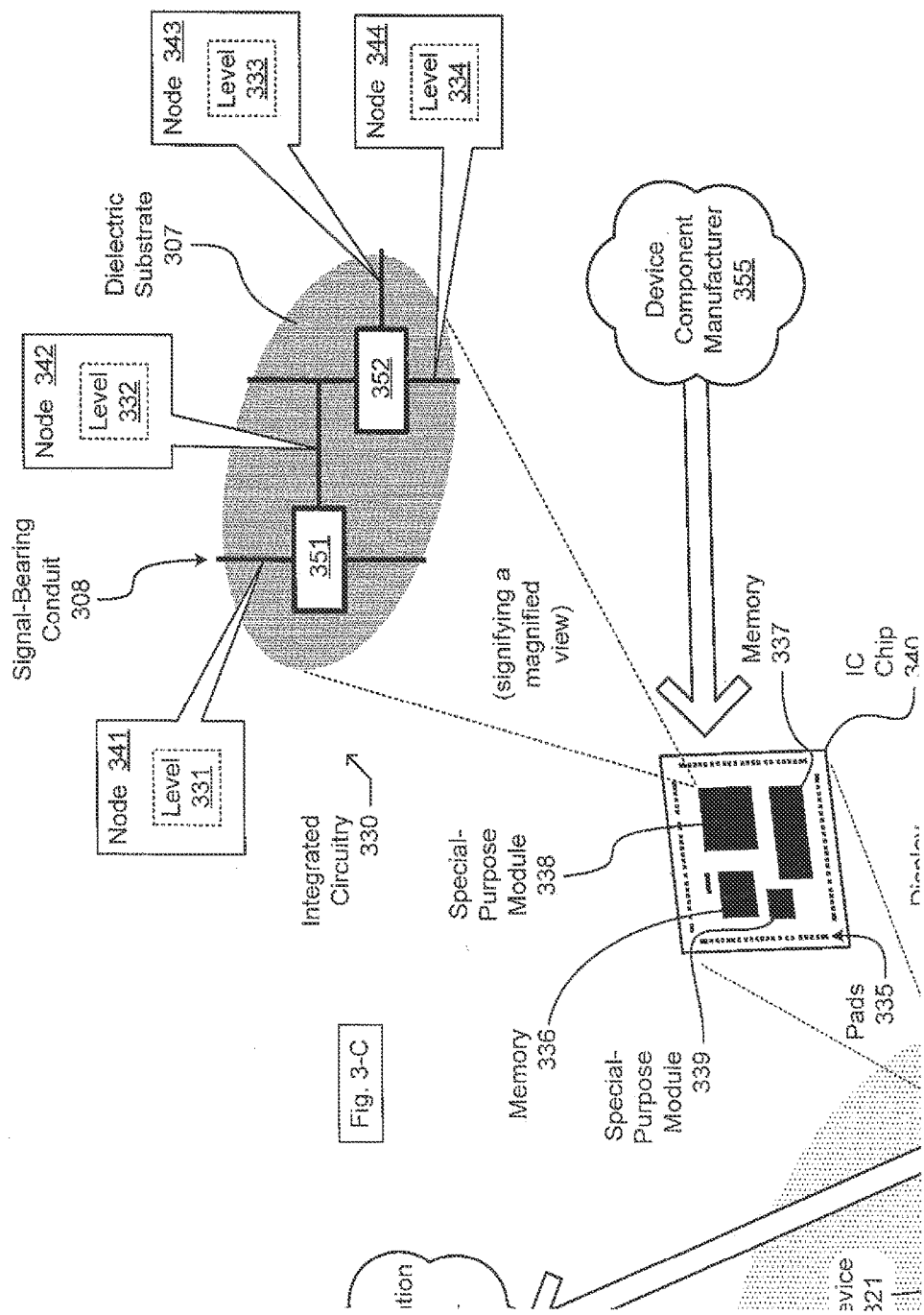

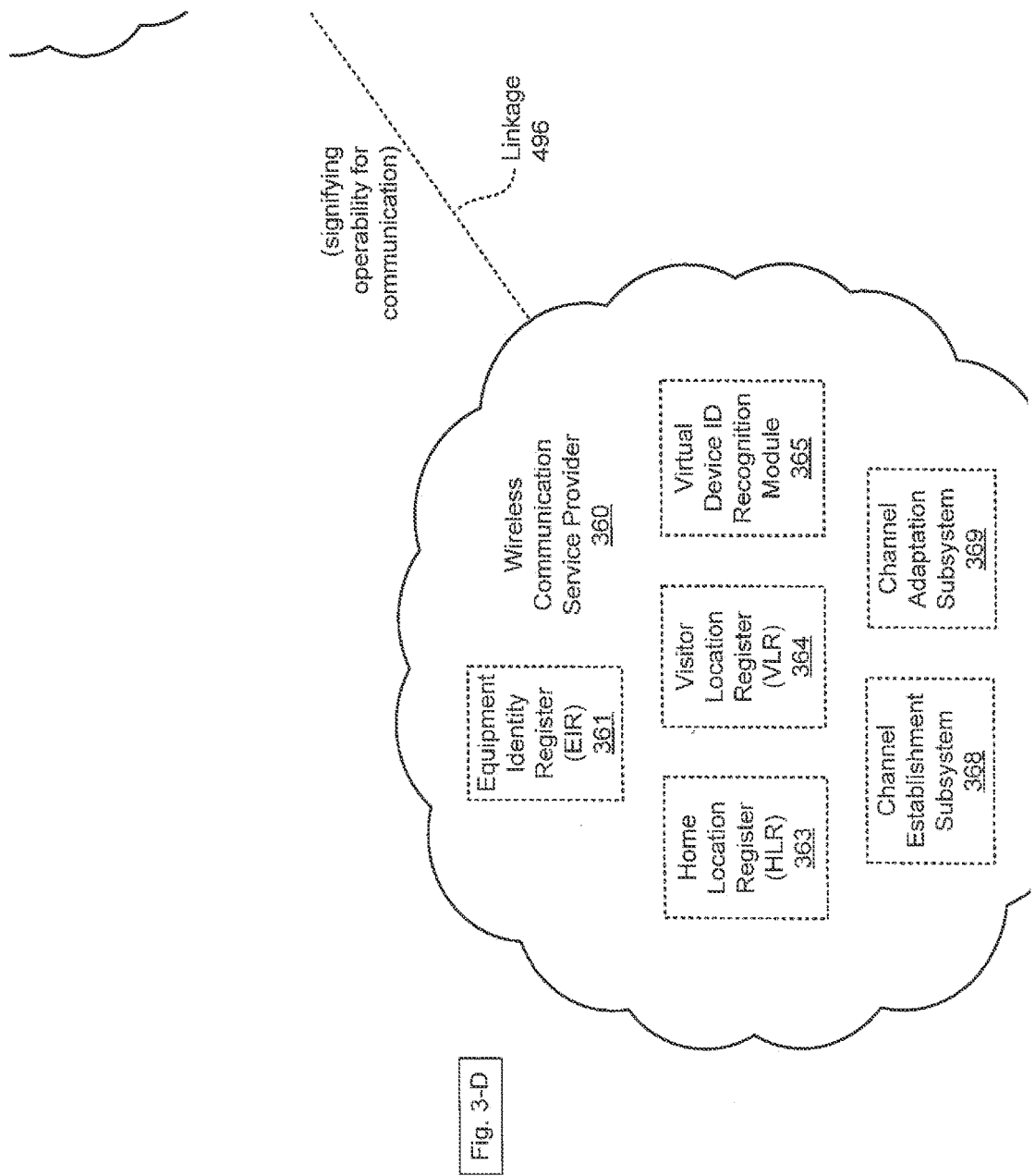

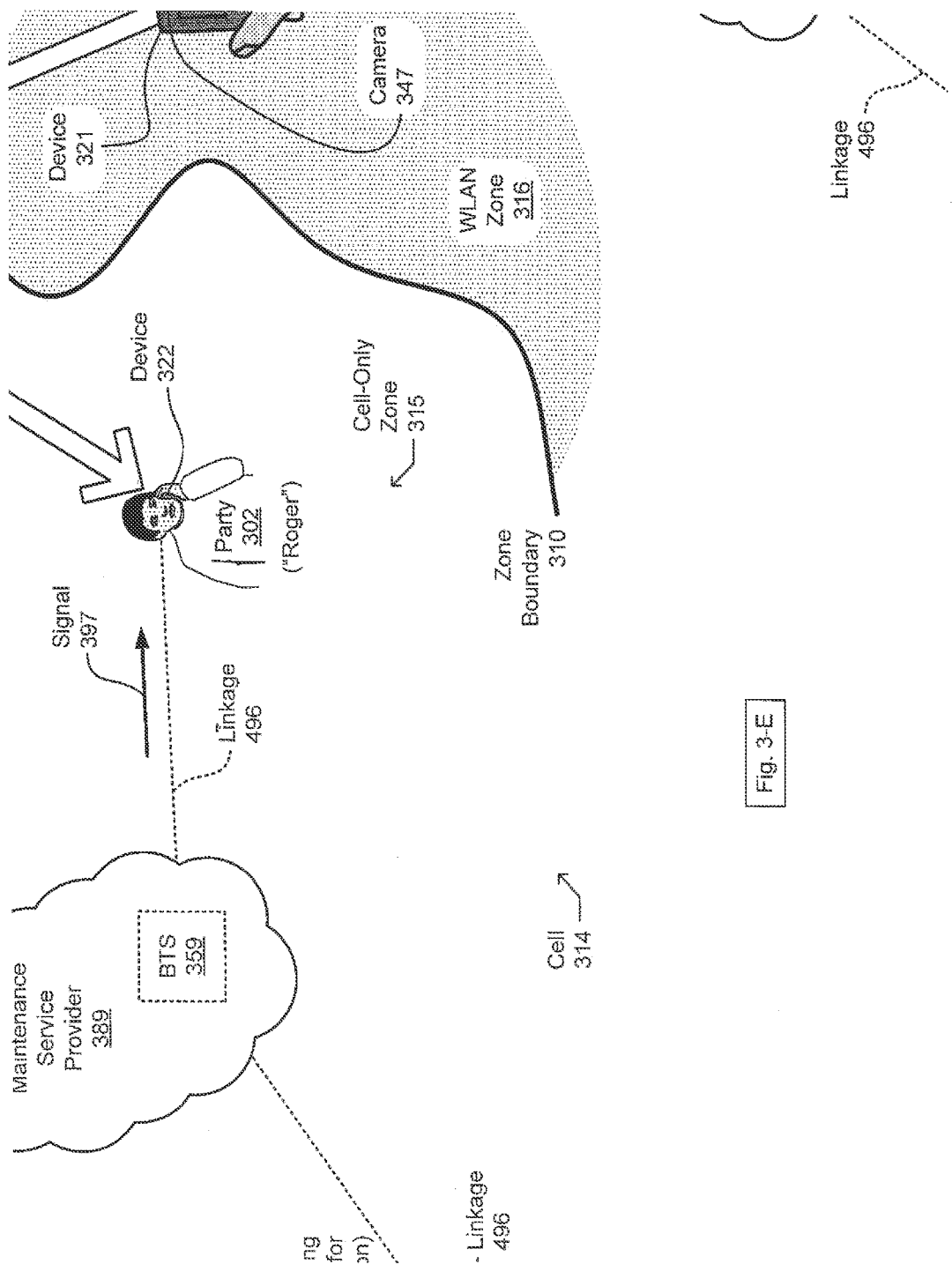

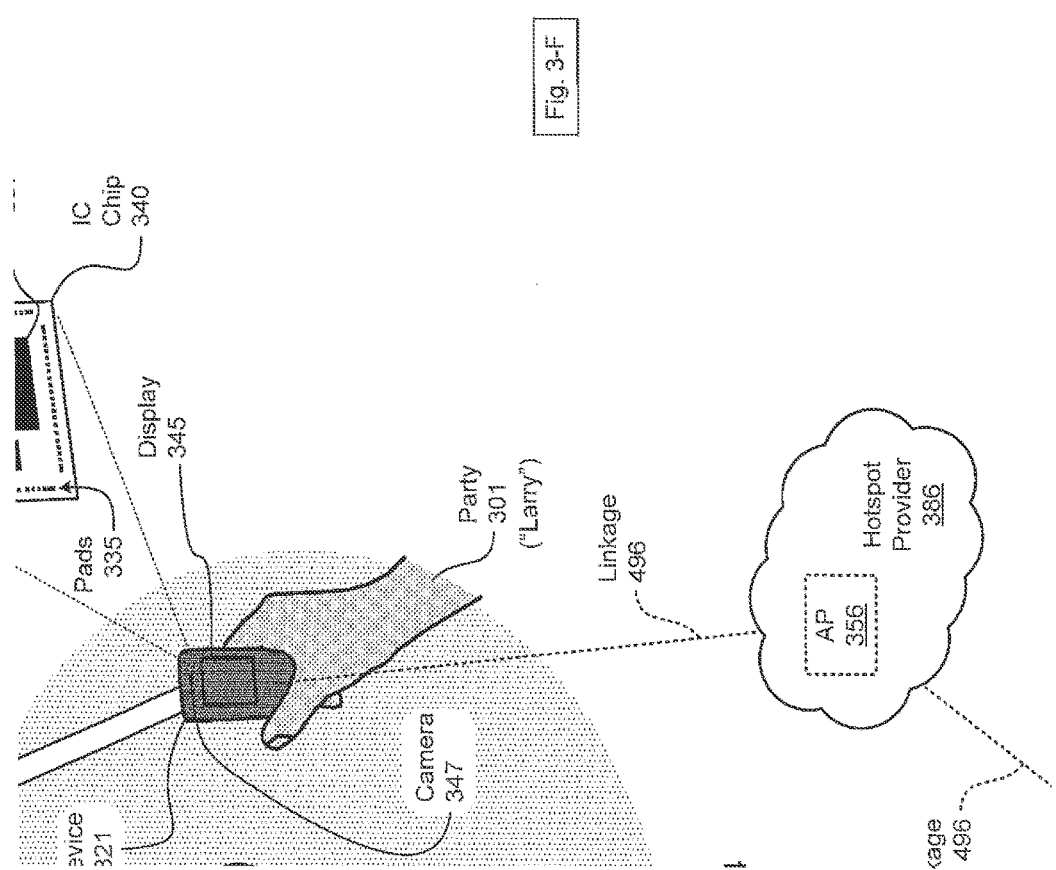

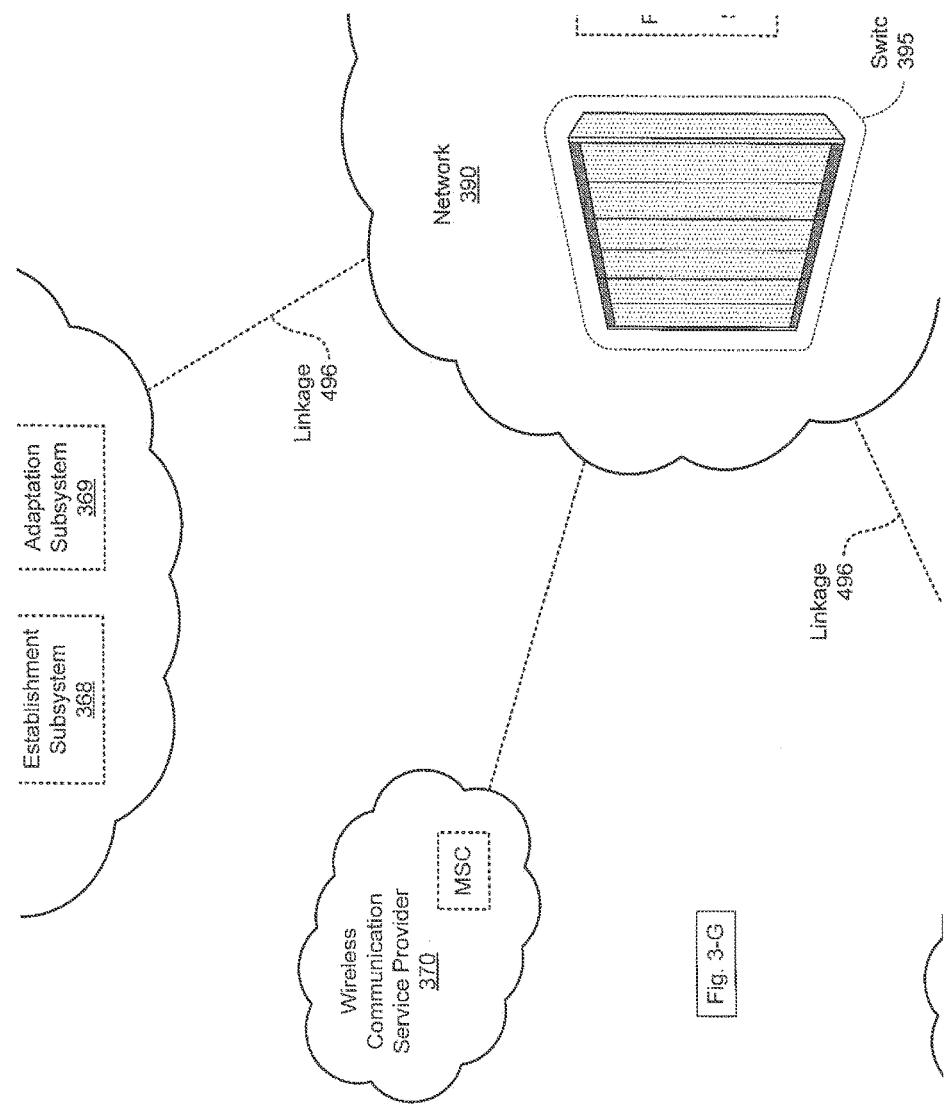

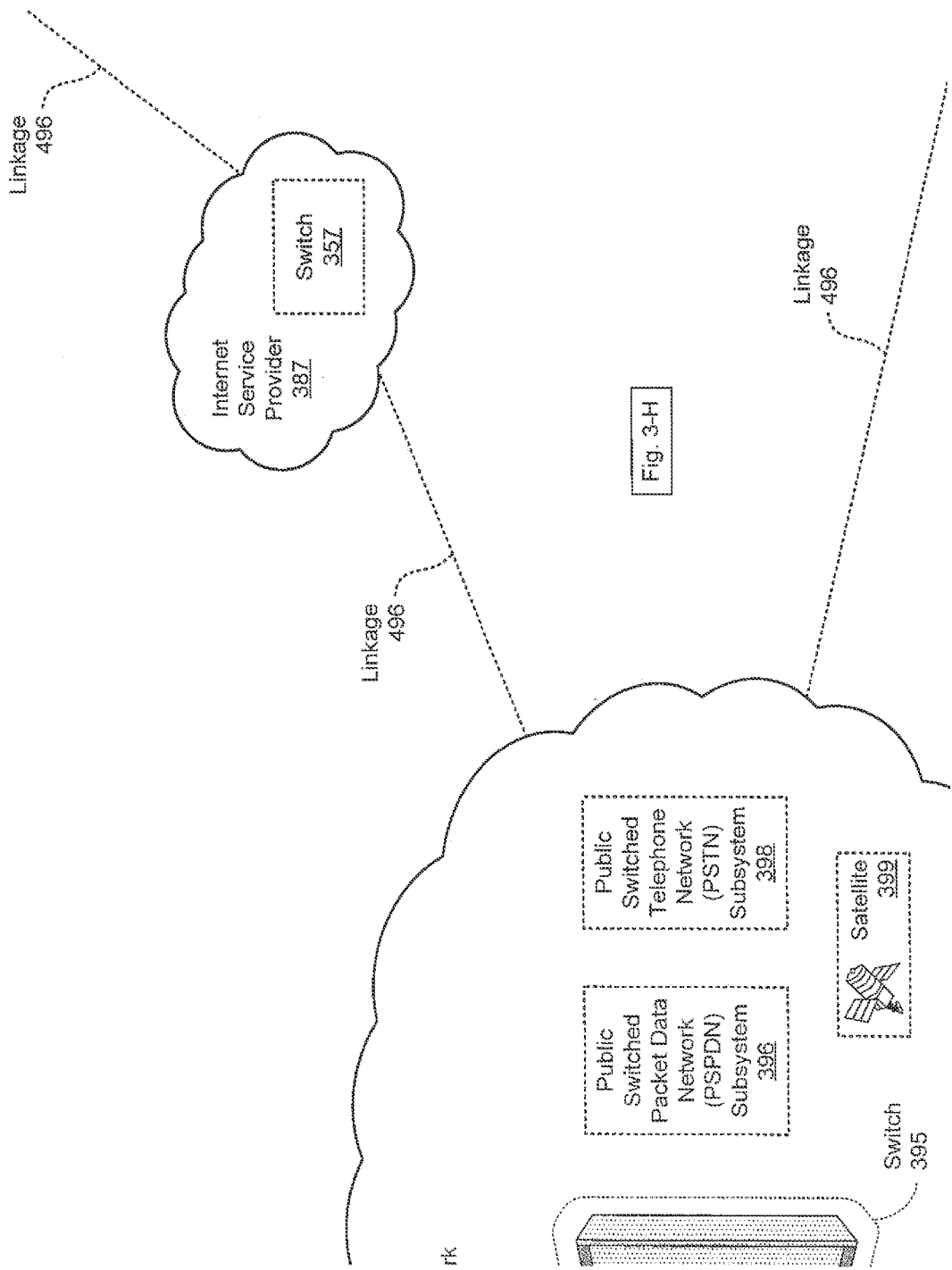

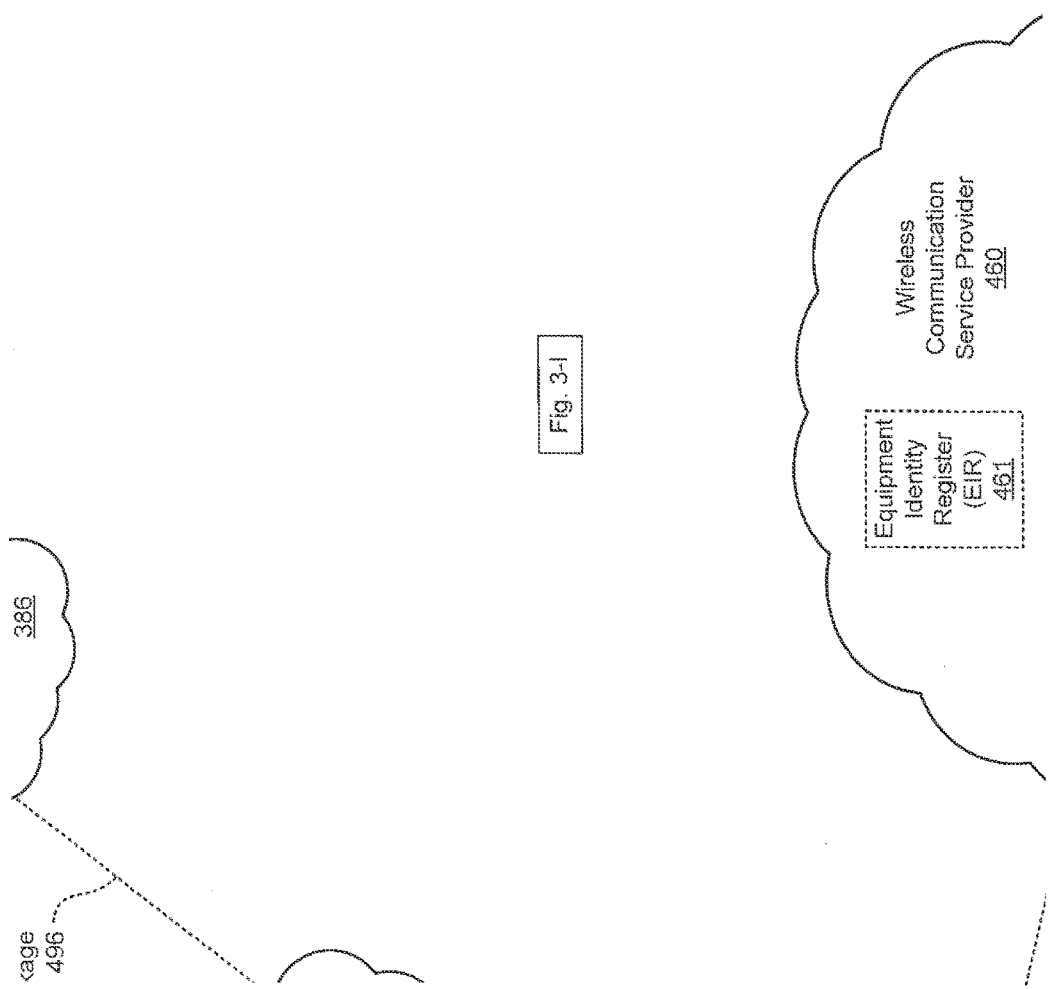

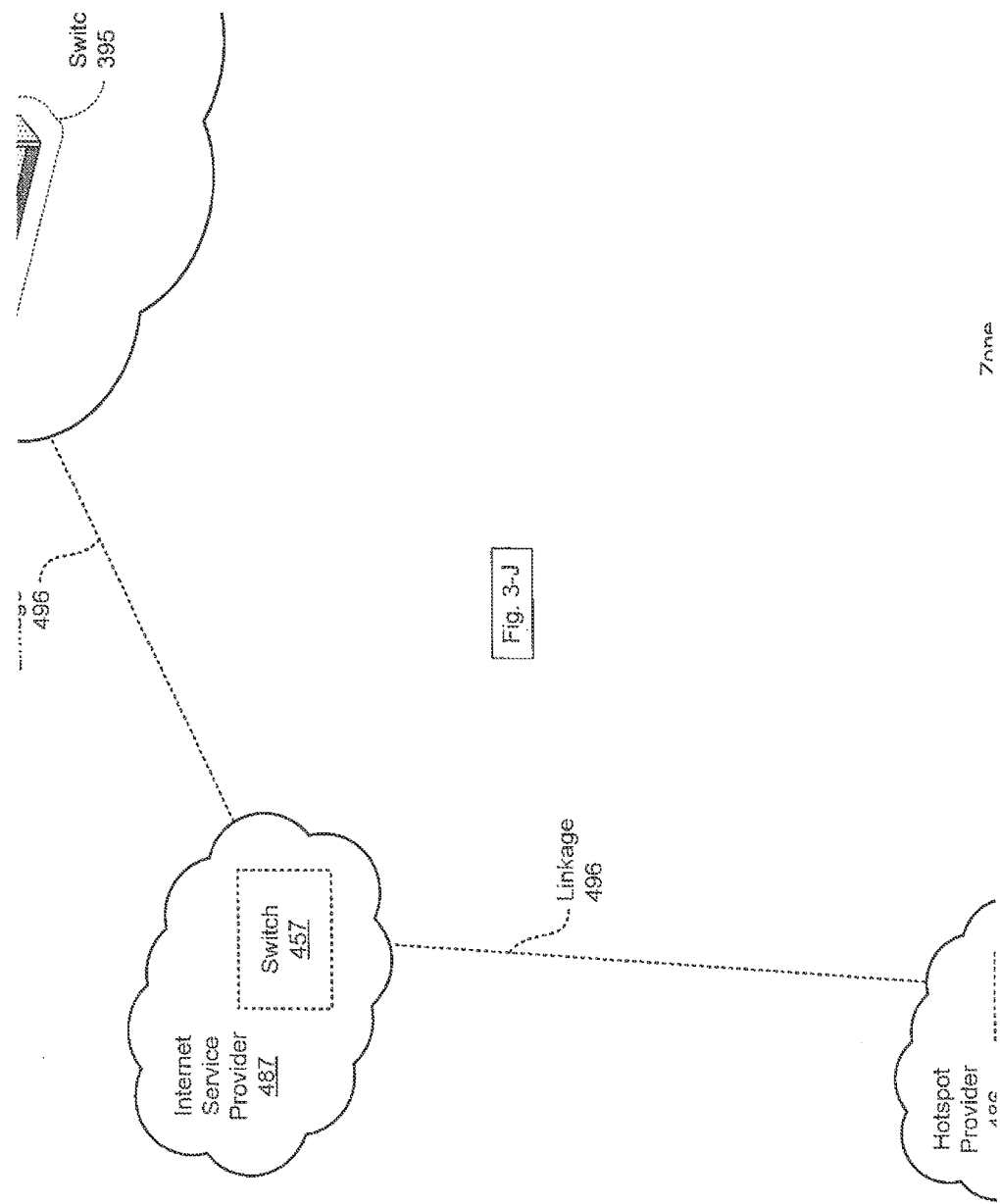

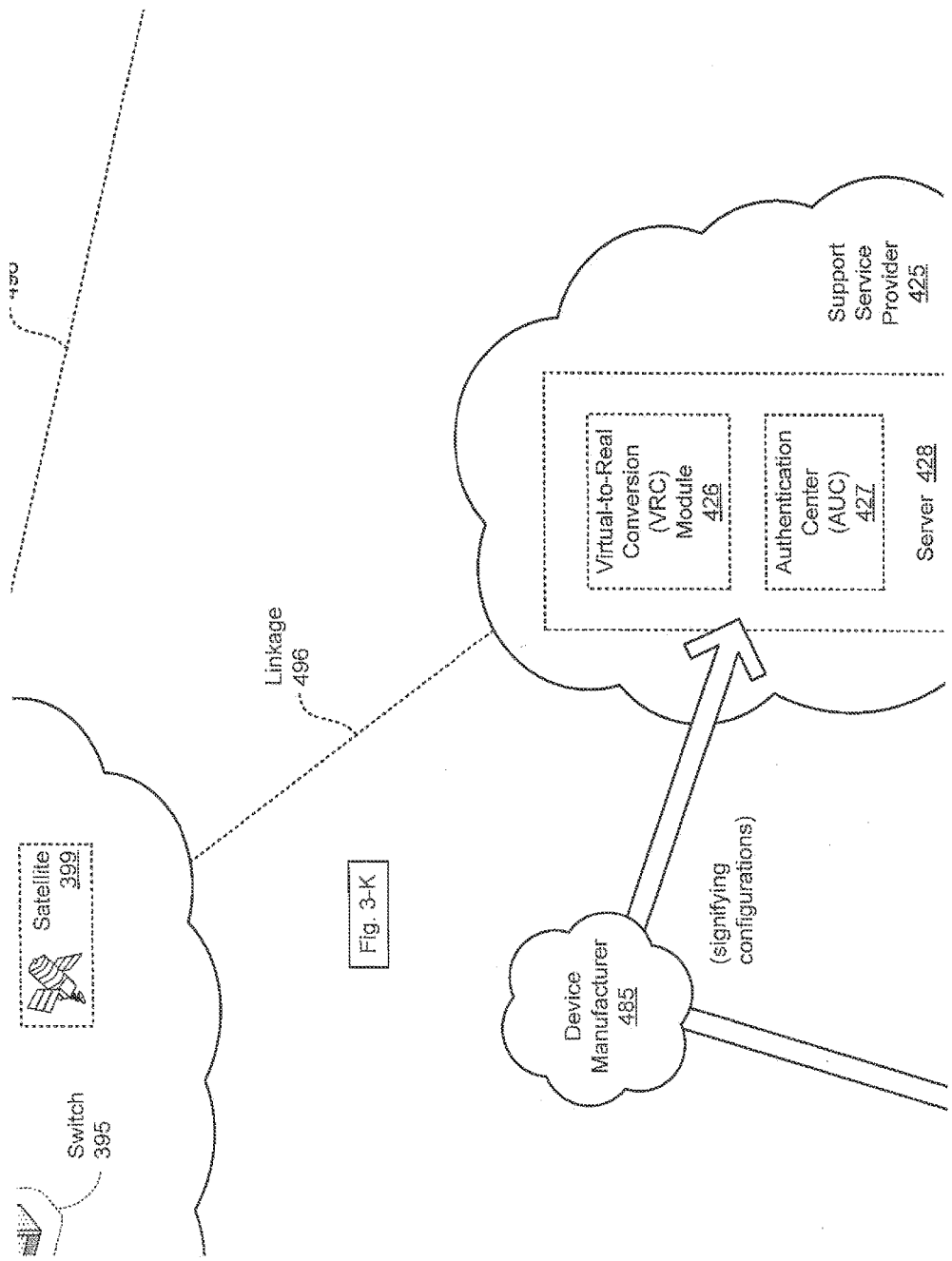

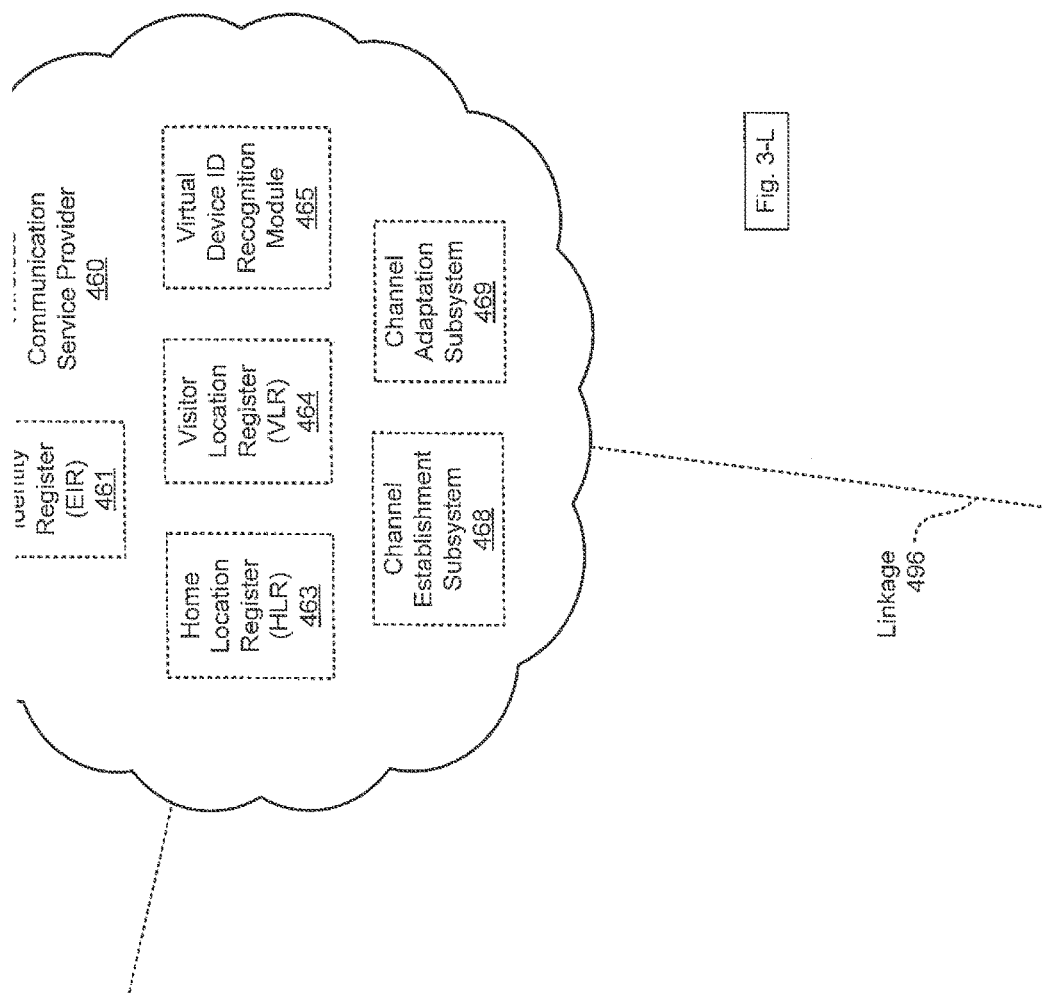

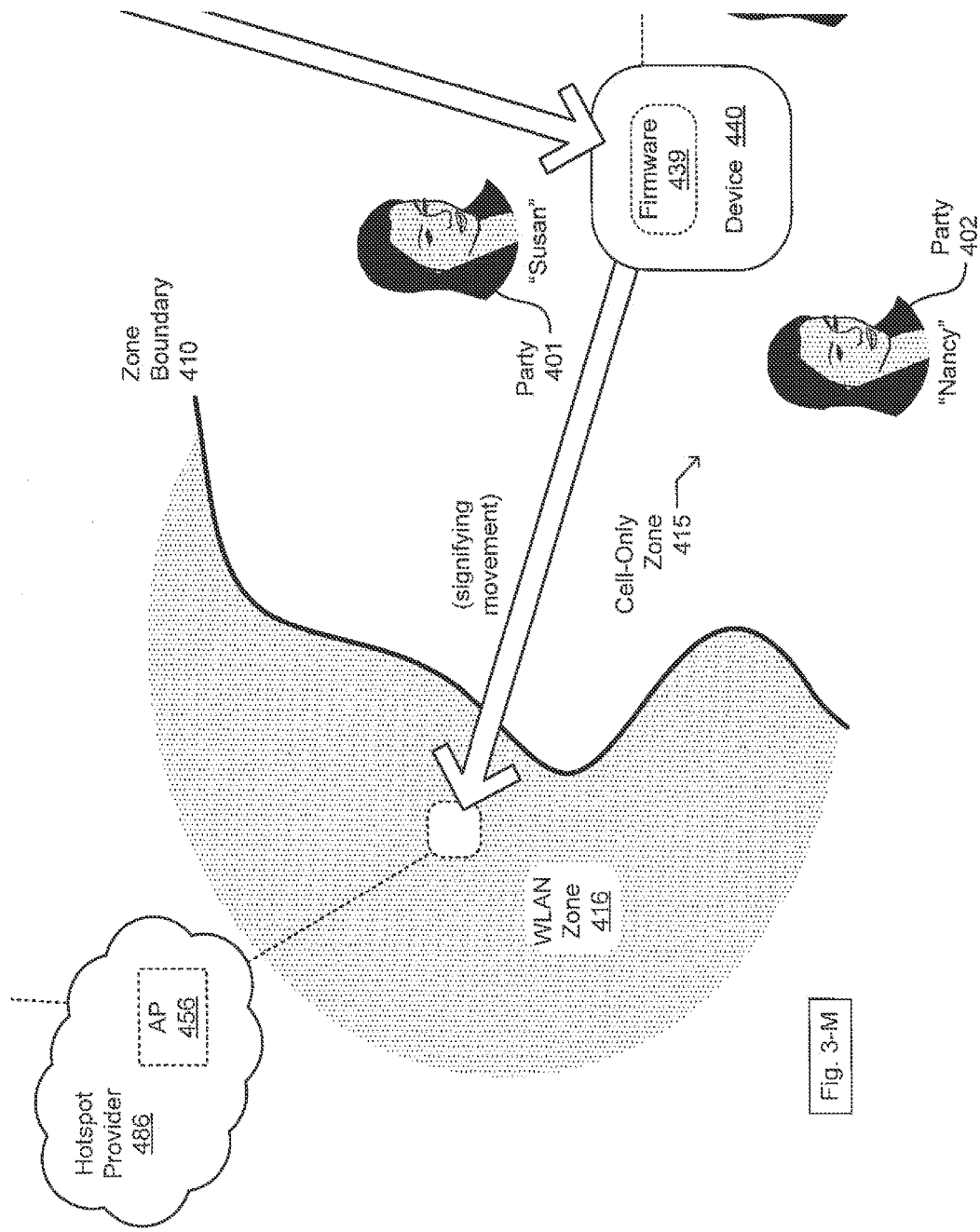

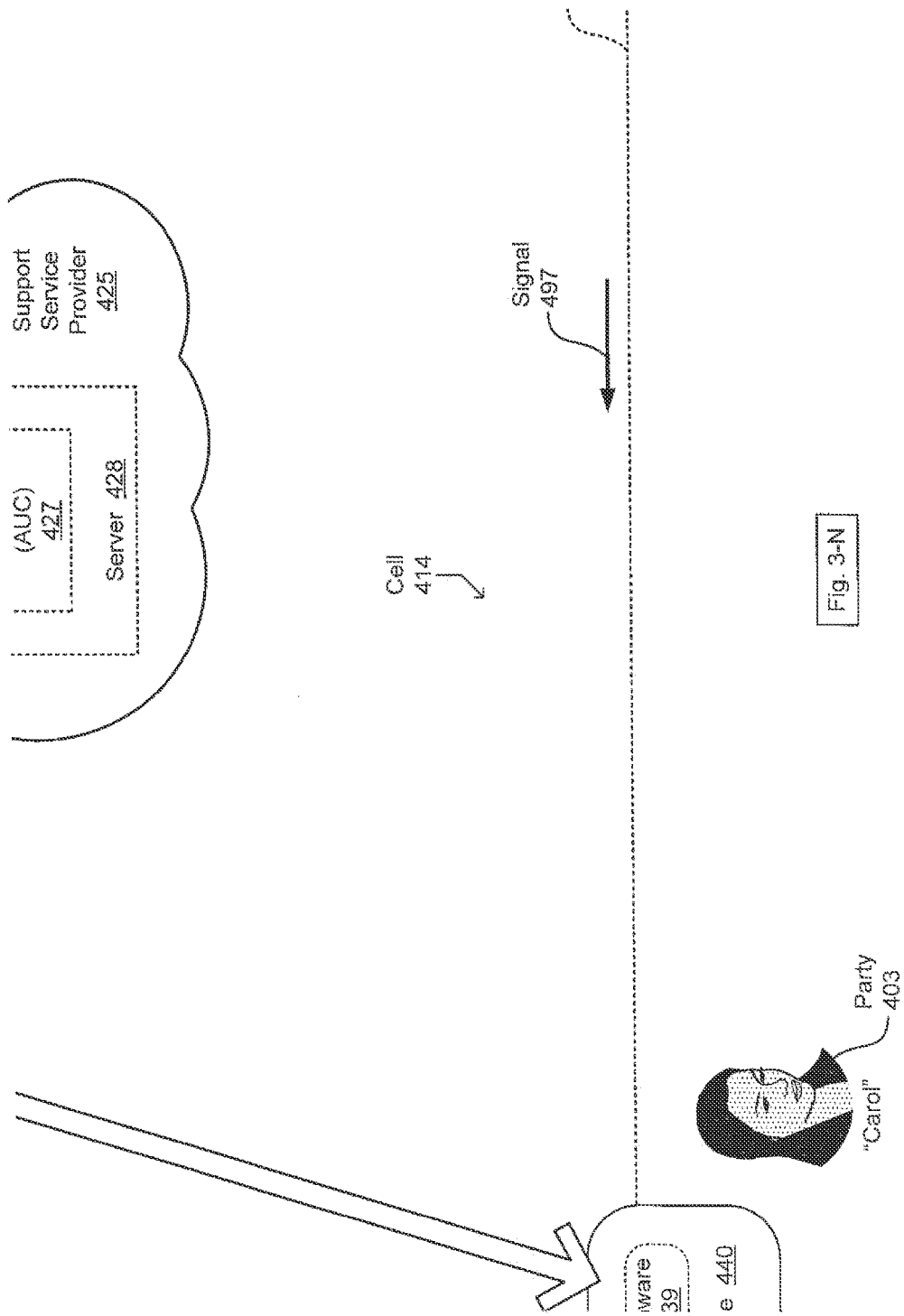

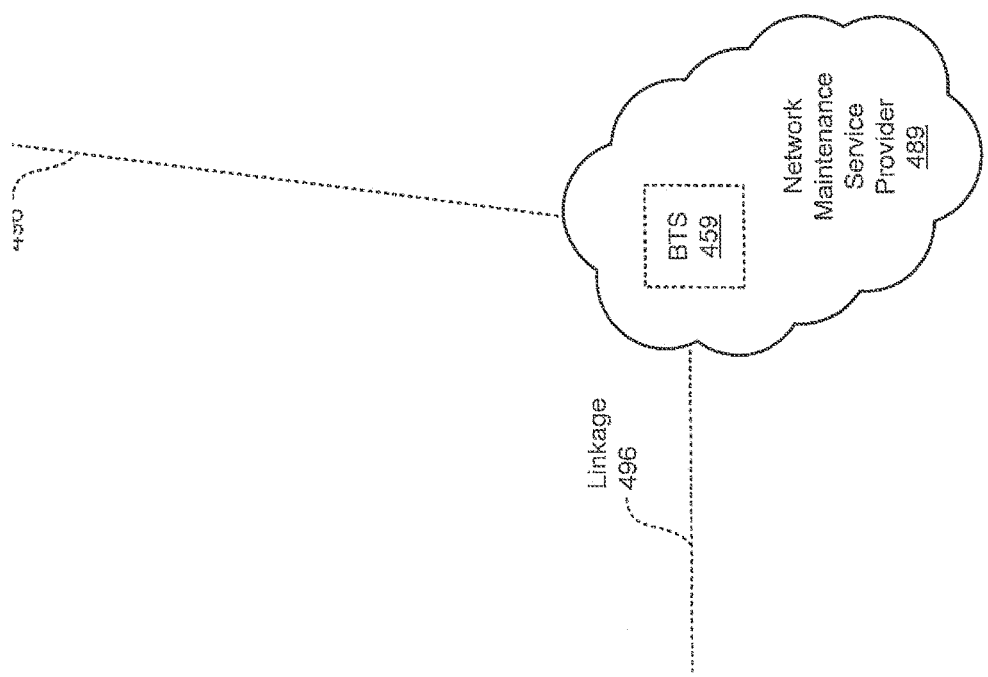

MOBILE DEVICE SHARING FACILITATION METHODS AND SYSTEMS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)). In addition, the present application is related to the "Related applications," if any, listed below.

PRIORITY APPLICATIONS

Not applicable.

RELATED APPLICATIONS

Not applicable.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

TECHNICAL FIELD

This disclosure relates to facilitating connectivity in wireless communications.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3 comprises a 15-sheet depiction of an environment in which several entities may interact via a network and in which sub-parts are labeled as FIGS. 3-A through 3-O.

FIG. 3-A depicts a 3×5 grid of view identifiers of the 15 respective sub-parts of FIG. 3.

FIG. 3-B comprises a portion of FIG. 3 that depicts a device reconfiguration service provider.

FIG. 3-C comprises a portion of FIG. 3 that depicts in integrated circuit chip and a device component manufacturer.

FIG. 3-D comprises a portion of FIG. 3 that depicts a first wireless communication service provider.

FIG. 3-E comprises a portion of FIG. 3 that depicts a party using a first mobile device after it is reconfigured (to facilitate device sharing via one or more dependent identifiers, e.g.).

FIG. 3-F comprises a portion of FIG. 3 that depicts another party using the first mobile device before it is reconfigured.

FIG. 3-G comprises a portion of FIG. 3 that depicts a telephone switch.

FIG. 3-H comprises a portion of FIG. 3 that depicts a first internet service provider (ISP).

FIG. 3-I comprises a portion of FIG. 3 that depicts first resources of a second wireless communication service provider.

FIG. 3-J comprises a portion of FIG. 3 that depicts a second internet service provider.

FIG. 3-K comprises a portion of FIG. 3 that depicts a support service provider and a device manufacturer.

FIG. 3-L comprises a portion of FIG. 3 that depicts second resources of the second wireless communication service provider.

FIG. 3-M comprises a portion of FIG. 3 that depicts a wireless local area network (WLAN) zone and parties who can use a second mobile device.

FIG. 3-N comprises a portion of FIG. 3 that depicts another party who can use the second mobile device.

FIG. 3-O comprises a portion of FIG. 3 that depicts a network maintenance service provider that can facilitate cellular service to the second mobile device.

DETAILED DESCRIPTION

Figure 1:
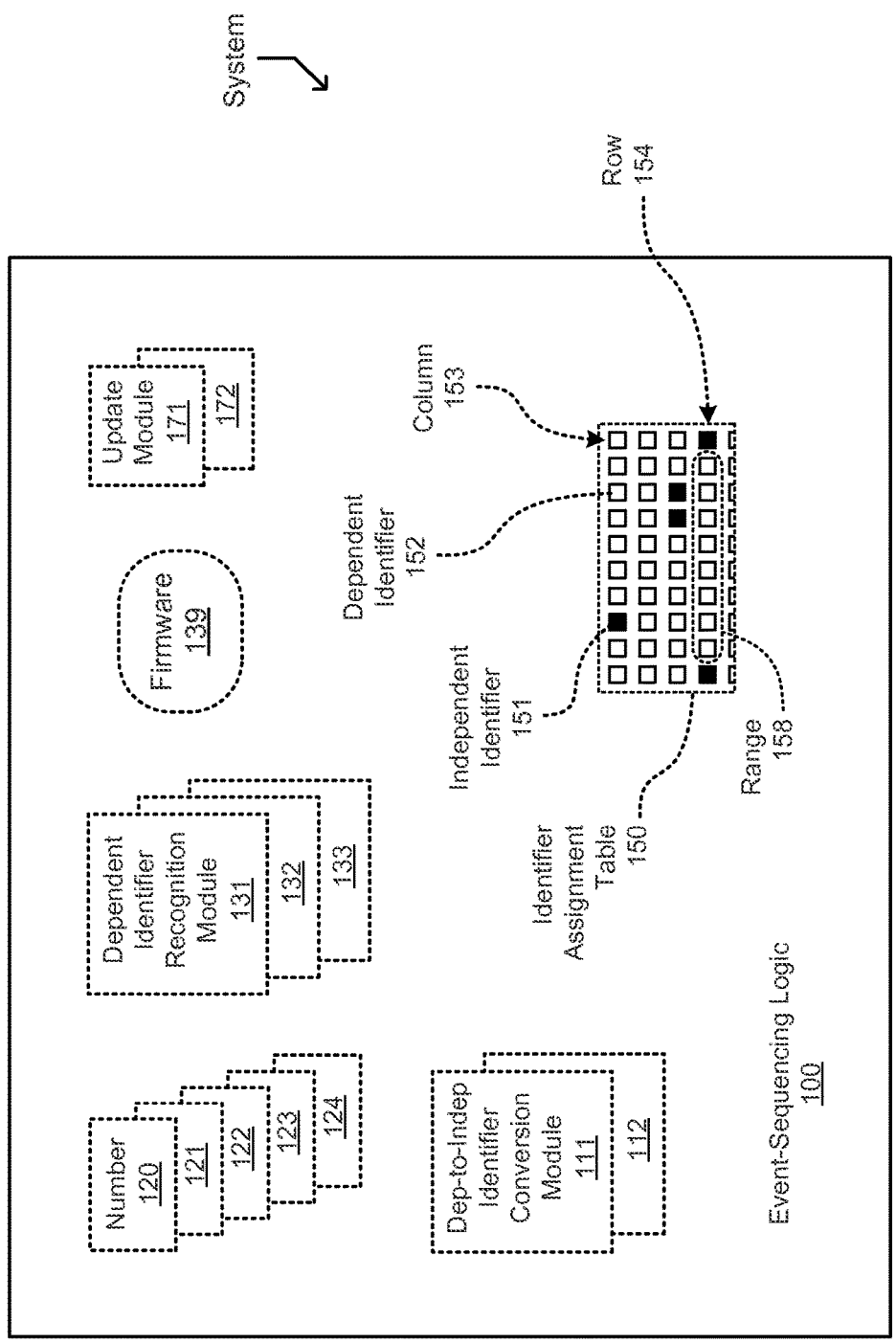
FIG. 1 depicts an exemplary environment in which one or more technologies may be implemented, including event-sequencing logic (a schematic depiction of an electronic or electromechanical apparatus implemented as circuitry, e.g.).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

There are circumstances in which a person who uses mobile communication or computing devices (smartphones or tablet computers, e.g.) might benefit from sharing the devices for a period (of an hour or more, e.g.) with one or more other people. Likewise there are circumstances in which such devices may be used more effectively by operating them as virtual mobile devices (as guests on a physical device or in a cloud service implementation, e.g.) or by using virtual identifiers (phone numbers, e.g.) that effectively correspond to a virtual party (of one or more human beings, e.g.) for an extended period (of up to a few years, e.g.). Although services like call forwarding or Google Voice provide device users with various capabilities in conjunction with mobile phones, such capabilities do not adequately take into account the unique characteristics of mobile devices or the needs and preferences of users with only a limited access to them. Various device configurations and protocols described herein address these shortcomings. In the interest of concision and according to standard usage in communication technologies, such features are set forth in natural language expressions. It will be understood by those skilled in the art that such expressions (functions or acts recited in English, e.g.) adequately describe structures identified below so that no undue experimentation will be required for their implementation.

In light of teachings herein numerous existing techniques may be applied for configuring special purpose circuitry or other structures effective for obtaining user preferences as described herein without undue experimentation. See, e.g., U.S. Pat. No. 8,447,352 ("Method and apparatus for communicating via virtual office telephone extensions"); U.S. Pat. No. 8,316,394 ("Interactive media guidance application with intelligent navigation and display features"); U.S. Pat. No. 8,311,513 ("Automated mobile system"); U.S. Pat. No. 8,301,564 ("Interacting with user at ATM based on user preferences"); U.S. Pat. No. 8,280,913 ("Systems and methods for management of contact information"); U.S. Pat. No. 7,925,250 ("Reuse of a mobile device application in a desktop environment"); U.S. Pat. No. 7,743,334 ("Dynamically configuring a web page"); U.S. Pat. No. 7,664,720 ("Method and product of manufacture for the recommendation of optimizers in a graphical user interface for mathematical solvers"); U.S. Pat. No. 7,650,319 ("Adaptive pattern recognition based controller apparatus and method and human-factored interface therefore"); U.S. Pat. No. 7,593,812 ("Technique for effective navigation based on user preferences"); U.S. Pat. No. 7,567,305 ("Method for selecting preference channel and digital TV using the same"); U.S. Pat. No. 7,522,992 ("Technique for effective navigation based on user preferences"); U.S. Pat. No. 7,516,092 ("System and method for performing purchase transactions utilizing a broadcast-based device"); U.S. Pat. No. 7,344,063 ("Networked disposal and sample provisioning apparatus"); U.S. Pat. No. 7,305,079 ("Method and apparatus for communicating with one of plural devices associated with a single telephone number"); U.S. Pat. No. 7,260,203 ("Method and apparatus for routing calls based on identification of the calling party or calling line"); U.S. Pat. No. 7,245,913 ("Handset mode selection based on user preferences").

In light of teachings herein numerous existing techniques may be applied for configuring special purpose circuitry or other structures effective for establishing or characterizing a communication channel as described herein without undue experimentation. See, e.g., U.S. Pat. No. 8,234,523 ("Automatic determination of success of using a computerized decision support system"); U.S. Pat. No. 8,233,471 ("Wireless network system and method for providing same"); U.S. Pat. No. 8,145,975 ("Universal packet loss recovery system for delivery of real-time streaming multimedia content over packet-switched networks"); U.S. Pat. No. 8,054,856 ("Method for synchronizing voice traffic with minimum latency in a communications network"); U.S. Pat. No. 7,835,314 ("Physical layer interface system and method for a wireless communication system"); and U.S. Pat. No. 7,787,896 ("Dispatch service architecture framework").

In light of teachings herein, moreover, numerous existing techniques may be applied for configuring special-purpose circuitry or other structures effective for implementing various wireless linkages 496 as depicted herein as described herein without undue experimentation. See, e.g., U.S. Pat. No. 8,311,509 ("Detection, communication and control in multimode cellular, TDMA, GSM, spread spectrum, CDMA, OFDM WiLAN and WiFi systems"); U.S. Pat. No. 8,259,822 ("Polar and quadrature modulated cellular, WiFi, WiLAN, satellite, mobile, communication and position finder systems"); U.S. Pat. No. 8,249,256 ("Method for providing fast secure handoff in a wireless mesh network"); U.S. Pat. No. 8,248,968 ("Method and apparatus for providing mobile inter-mesh communication points in a multi-level wireless mesh network"); U.S. Pat. No. 8,223,694 ("Enhanced information services using devices in short-range wireless networks"); U.S. Pat. No. 8,219,312 ("Determining speed parameters in a geographic area"); U.S. Pat. No. 8,200,243 ("Mobile television (TV), internet, cellular systems and Wi-Fi networks"); U.S. Pat. No. 8,184,656 ("Control channel negotiated intermittent wireless communication"); U.S. Pat. No. 8,169,311 ("Wireless transmission system for vehicular component control and monitoring"); U.S. Pat. No. 8,165,091 ("Efficient handover of media communications in heterogeneous IP networks using LAN profiles and network handover rules"); U.S. Pat. No. 8,125,896 ("Individualizing a connectivity-indicative mapping"); U.S. Pat. No. 8,111,622 ("Signal routing dependent on a node speed change prediction"); U.S. Pat. No. 8,098,753 ("Infrared, touch screen, W-CDMA, GSM, GPS camera phone"); U.S. Pat. No. 7,646,712 ("Using a signal route dependent on a node speed change prediction"); U.S. patent application Ser. No. 13/317,988 (Context-sensitive query enrichment"); U.S. patent application Ser. No. 11/252,206 ("Signal routing dependent on a loading indicator of a mobile node"); U.S. patent application Ser. No. 11/221,421 ("Heading dependent routing"); and U.S. patent application Ser. No. 11/221,396 ("Heading dependent routing method and network subsystem").

With reference now to FIG. 1, a system is shown in schematic form comprising event-sequencing logic 100 (transistor-based circuitry including electrical node sets each having a voltage configuration that manifests an informational structure, e.g.). Event-sequencing logic 100 includes one or more instances of dependent-to-independent conversion modules 111, 112; of mobile numbers 120, 121, 122, 123, 124; of dependent identifier recognition modules 131, 132, 133; of update modules 171, 172; of identifier assignment tables 150; or of other such entities. In some variants, as described below, some or all of these may (optionally) reside in firmware 139. Alternatively or additionally, each such instance of identifier assignment tables 150 may include several instances of columns 153, rows 154, ranges 158, or other groupings each configured to map or otherwise associate zero or more dependent identifiers 152 (each depicted as a white square and representing a user or party identifier, e.g.) with each independent identifier 151 (depicted as a black square and representing a device identifier, e.g.). Various configurations of dependent identifier recognition module (DIRM) 131-133 permit dependent identifiers 152 to be identified as such by an intrinsic property of the identifier. DIRM 131 determines that an identifier (mobile number, e.g.) is independent only if its last three digits form an integer evenly divisible by X, in which 1<X<10 (with X=2, deeming an identifier dependent if it is odd and independent if it is even, e.g.). DIRM 132 determines that an identifier is independent if it contains a digit equal to Y and otherwise determines that it is dependent (with Y being any digit 0 to 9). In some contexts, an intrinsic recognition protocol can comprise invoking two or more such modules, as further described below.

Figure 2:
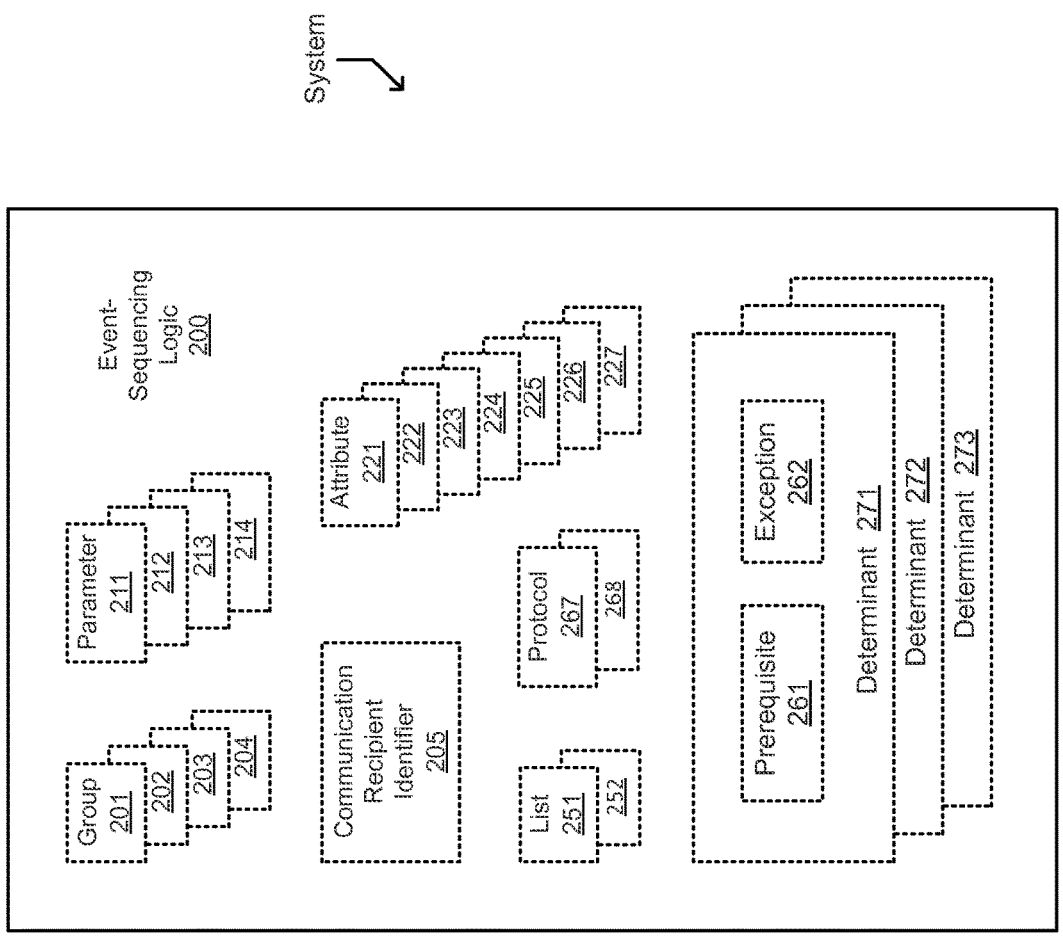
FIG. 2 depicts an exemplary environment in which one or more technologies may be implemented, including event-sequencing logic.

With reference now to FIG. 2, a system is shown in schematic form comprising event-sequencing logic 200 (transistor-based circuitry including electrical node sets each having a voltage configuration that manifests an informational structure, e.g.). Event-sequencing logic 200 includes one or more instances of groups 201, 202, 203, 204; of communication recipient identifiers 205; of parameters 211, 212, 213, 214; of alphanumeric attributes 221, 222, 223, 224, 225, 226, 227; of lists 251, 252; of protocols 267, 267; or of determinants 271, 272, 273 (a prerequisite 261 or exception 262, e.g.) as described below.

With reference now to FIG. 3, there is shown a high-level environment diagram depicting a system 300 in or across which one or more instances of event-sequencing logic 100, 200 or components thereof may be instantiated (in subsystems or mobile devices described below, e.g.) and in which one or more technologies may be implemented. In accordance with 37 CFR 1.84(h)(2), FIG. 3 shows "a view of a large machine or device in its entirety . . . broken into partial views . . . extended over several sheets" labeled FIG. 3-A through FIG. 3-O (Sheets 3-17). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 3-A to 3-O are ordered alphabetically, by increasing column from left to right, as shown here:

| FIG. 3-A | FIG. 3-B | FIG. 3-C |
| FIG. 3-D | FIG. 3-E | FIG. 3-F |
| FIG. 3-G | FIG. 3-H | FIG. 3-I |
| FIG. 3-J | FIG. 3-K | FIG. 3-L |
| FIG. 3-M | FIG. 3-N | FIG. 3-O |

Because FIG. 3 is a high-level environment diagram, some elements of system 300 are expressed through the function they carry out. In such circumstances, these elements should be considered to include any combination of one or more program, microprocessor configuration, state machine, transistor-based event sequencing structure, firmware, field-programmable gate array ("FPGA") configuration, application programming interface ("API"), function, class, data structure, dynamically loaded library ("DLL"), database (e.g., SQL database), or other such special-purpose modules implemented in a structure or method eligible for patent protection under 35 U.S.C. §101.

With reference now to FIG. 3-B, there is shown a device reconfiguration service provider 388 and a network maintenance service provider 389.

With reference now to FIG. 3-C, there is shown an integrated circuit (IC) chip 340 provided by a device component manufacturer 355. IC chip 340 includes pads 335 distributed about a periphery of a dielectric substrate 307 upon which many transistors 351, 352 are configured to form several functional blocks (e.g. memories 336, 337 and special-purpose modules 338, 339 such as those described below). Such integrated circuitry 330 primarily comprises transistors 351, 352 operably coupled by electrically conductive signal-bearing conduits 308. Informational data identified herein may easily be represented digitally as a voltage configuration on (a "set" of one or more) electrical nodes 341, 342, 343, 344 (voltage levels 331, 332, 333, 334 on respective conduits or pads 335, e.g.) of an event-sequencing structure (an instance of transistor-based circuitry on integrated circuit 330, e.g.) without any undue experimentation.

With reference now to FIG. 3-D, there is shown a wireless communication service provider 360 including one or more instances mobile switching center (MSC) resources. Such resources include one or more instances of equipment identity registers (EIR) 361; home location registers (HLR) 363; of visitor location registers (VLR) 364; of virtual device identifier recognition modules (VDIDRM) 365; of channel establishment subsystems (CES) 368; or of channel adaptation subsystems (CAS) 369.

With reference now to FIG. 3-E, there is shown a base transceiver station (BTS) 359 of network maintenance service provider 389 configured to transmit a wireless signal 397 to a party 302 ("Roger") operating a mobile communication device 322. As shown, party 302 is in a cell-only zone 315 bounded by zone boundary 310. Also BTS 359 is operably coupled (via linkages 496 represented as dashed lines comprising signal paths through fiberoptic or free space or other passive transmission media and optionally through one or more active devices, e.g.) with wireless communication service provider 360 and device 322 as shown.

With reference now to FIG. 3-F, there is shown a mobile device 321 having a camera 347 and display 345 held by another party 301 (prior to being reconfigured by device reconfiguration service provider 388, e.g.). While in wireless local area network (WLAN) zone 316, moreover, device 321 is able to communicate via more than one type of wireless linkage 496. While in cell 314, for example, device 321 may communicate via BTS 359. While in WLAN zone 316, device 321 may likewise communicate via an access point 356 operated by hotspot provider 386. Within an overlap of cell 314 and WLAN zone 316, moreover, device 321 may communicate via either or both and may implement a handover in either direction.

With reference now to FIG. 3-G, there is shown a representation of a network 390 comprising one or more instances of switch 395. Network 390 is operably coupled with wireless communication service providers 360, 370 via one or more linkages 496 as shown.

With reference now to FIG. 3-H, there is shown a representation of several additional resources of network 390 comprising one or more instances of public switched packet data network (PSPDN) subsystems 396; of public switched telephone network (PSTN) subsystems 398; or of communications satellites 399. FIG. 3-H also shows an instance of a switch 357 operated by an internet service provider 387.

With reference now to FIG. 3-I, there is shown a representation of another wireless communication service provider 460 (having a contractual and operational relationship with provider 360 of FIG. 3-D, e.g.) including one or more instances mobile switching center (MSC) resources. Such resources include one or more instances of equipment identity registers (EIR) 461.

FIG. 3-J also shows an instance of a switch 457 maintained by an internet service provider 487 and operably coupled via communication linkages 496 (each comprising one or more fiberoptic conduits or free space media, e.g.) with network 390 and hotspot provider 486 as shown.

FIG. 3-K shows a support service provider 425 operating one or more instances of virtual-to-real conversion modules 426 or authentication centers (AUC) 427 residing on one or more servers 428 (to which device manufacturer 485 may communicate attributes, apps, or other digital components as described herein, e.g.).

With reference now to FIG. 3-L, there is shown a representation of one or more additional resources of provider 460: one or more instances of home location registers (HLR) 463; of visitor location registers (VLR) 464; of virtual device identifier recognition modules (VDIDRM) 465; of channel establishment subsystems (CES) 468; or of channel adaptation subsystems (CAS) 469.

With reference now to FIG. 3-M, there is shown an access point 456 operated by a hotspot provider 486 (a retailer, e.g.) providing wireless service (Wi-Fi, e.g.) to a WLAN zone 416 within cell 414. Hotspot provider 486 may be operably coupled with switch 457 and wirelessly operably coupled with a device that has entered WLAN zone 416 (by crossing zone boundary 410 from cell-only zone 415, e.g.) via linkages 496 as shown.

With reference now to FIG. 3-N, there is shown a mobile communication device 440 (smartphone or tablet computer, e.g.) having firmware 439 and initially associated with an independent identifier 151 (e.g. a "real" mobile number of "206-555-2460"). As described below, device 440 is later configured to be shared among a plurality of parties 401, 402, 403 ("Susan" and "Nancy" and "Carol") by respectively assigning dependent identifiers 152 (e.g. "virtual" mobile numbers of "206-555-2461" and "206-555-2462" and "206-555-2463"). As described below, each such identifier has one or more recognizable intrinsic attributes 221-227 so that a dependent identifier 152 (recognizable as such by a virtual device identifier recognition module 365, e.g.) need not be listed in a home location register 363 or visitor location register 364. In lieu of such listings, an identifier (provided in a phone call initiated from device 321, e.g.) that is "likely enough" to be virtual (about 5% likely or more, e.g.) may cause VDIDR module 365 to initiate an investigation protocol (invoking one or more instances of virtual-to-real conversion modules 426 or authentication centers 427 or similar resources, e.g.) effective to determine whether a corresponding physical destination (server 428 or device 440, e.g.) can be found (e.g. before reporting back to device 321 a mere fact that the identifier is "unlisted"). In some contexts, for example, such implementations may be facilitated by firmware 439 and a software configuration of server 428 (both having been provided by device manufacturer 485, e.g.).

With reference now to FIG. 3-O, there is shown a base transceiver station (BTS) 459 of network service provider 489 configured to transmit a wireless signal 497 to device 440 or to one or more parties 401, 402, 403 as described below.

Figure 4:
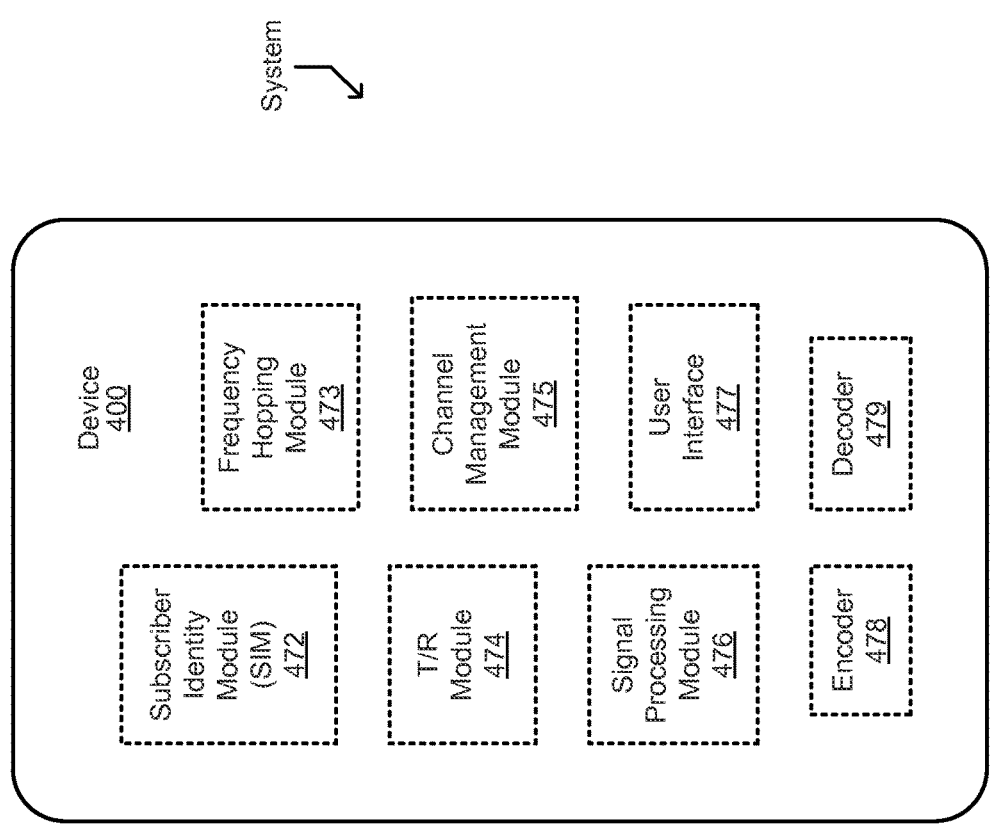
FIG. 4 depicts an exemplary environment in which one or more technologies may be implemented, including a schematic depiction of a device.

With reference now to FIG. 4, a system is shown in schematic form a handheld or other device 400 instantiated as one or more mobile devices 321, 440 depicted in FIG. 3. Event-sequencing logic (transistor-based circuitry including electrical node sets each having a voltage configuration that manifests an informational structure, e.g.) therein may include one or more instances of subscriber identity modules 472, frequency hopping modules 473, transmit/receive modules 474, channel management modules 475, signal processing modules 476, user interfaces 477, encoders 478, or decoders 479.

Figure 5:
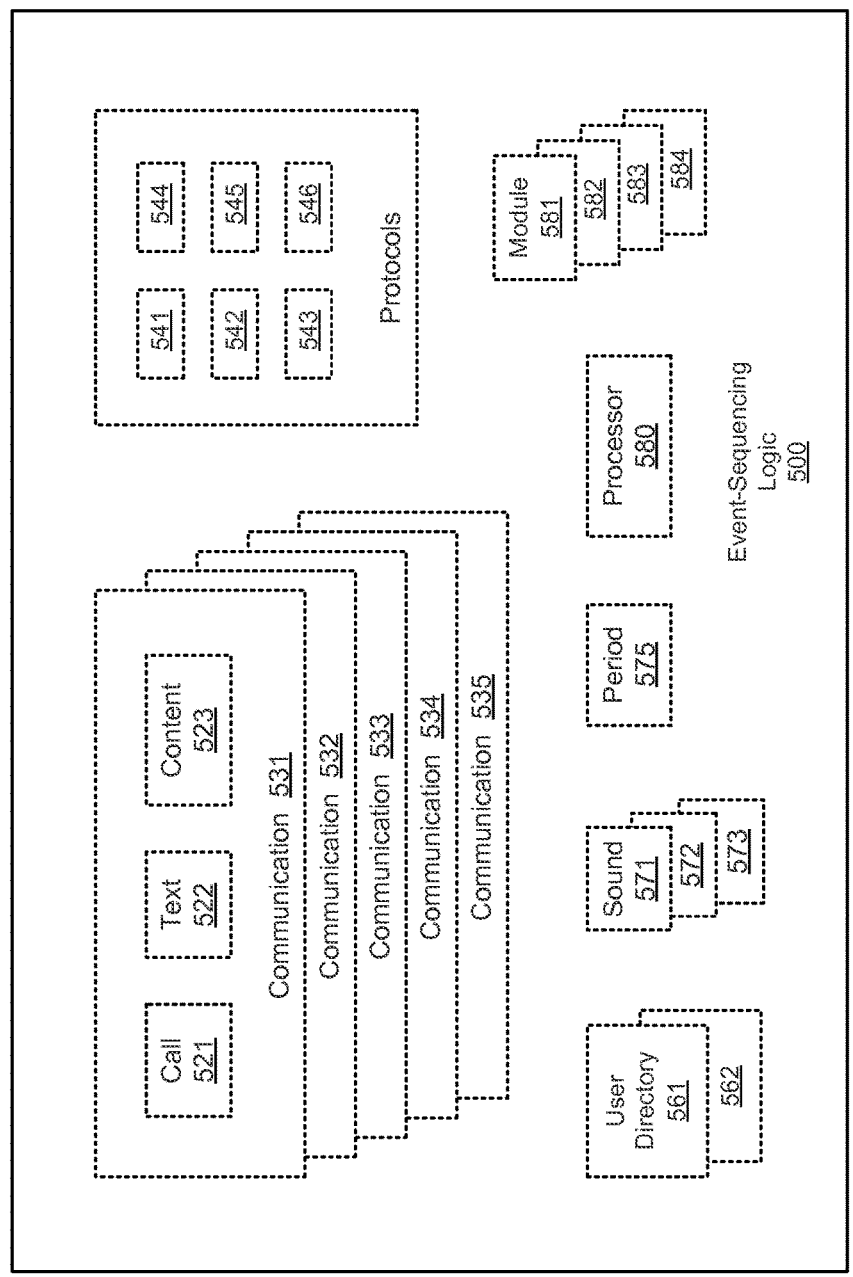
FIG. 5 depicts an exemplary environment in which one or more technologies may be implemented, including a schematic depiction of event-sequencing logic (a schematic depiction of an electronic or electromechanical apparatus implemented as circuitry, e.g.).

With reference now to FIG. 5, a system is shown in schematic form comprising event-sequencing logic 500 (transistor-based circuitry including electrical node sets each having a voltage configuration that manifests an informational structure, e.g.). Event-sequencing logic 500 may include one or more instances of communications 531, 532, 533, 534, 535; of protocols 541, 542, 543, 544, 545, 546; of user directories 561, 562; of digitally encoded sounds 571, 572, 573; of time periods 575; of transistor-based processors 580; or of modules 581, 582, 583, 584. Each such communication may include, for example, one or more instances of calls 521, of texts 522, or of other content 523 comprising a unidirectional communication (a broadcast, e.g.) or bidirectional communication (a teleconference among two or more instances of device 400, e.g.). One or more instances of event-sequencing logic 500 may be implemented, for example, in network 390 or in device 440.

Figure 6:
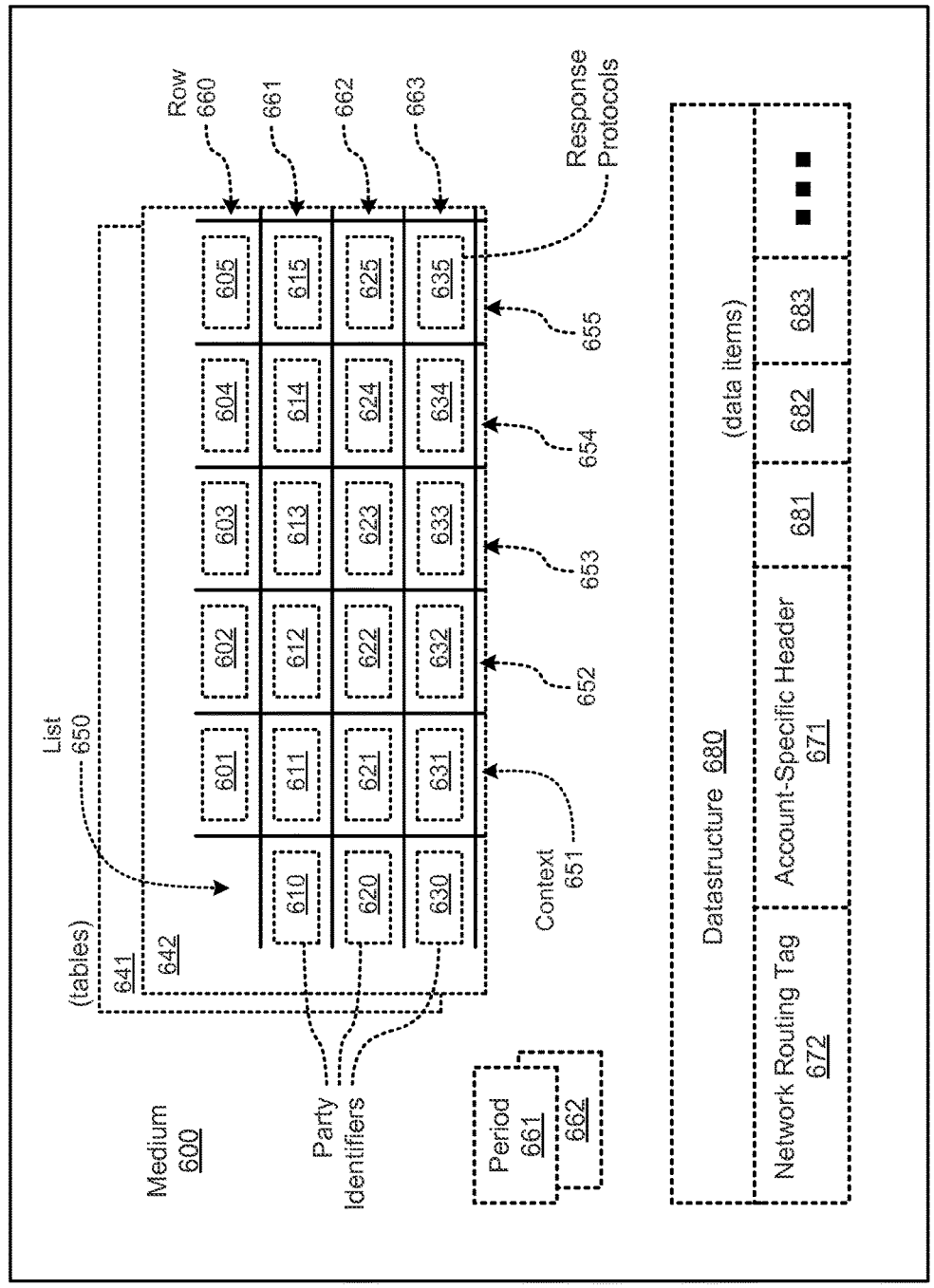
FIG. 6 depicts an exemplary environment in which one or more technologies may be implemented, including a schematic depiction of a data handling medium.

With reference now to FIG. 6, a system is shown in schematic form comprising data-handling medium 600 (node sets each having a magnetic or voltage configuration that manifests an informational structure, e.g.). Medium 600 (comprising a memory or storage medium, e.g.) may include one or more instances of tables 641, 642 that each map one or more rows 660 of response protocols 635 (each comprising a pointer or other operational parameter relating to software executable by one or more processors 580, e.g.) to two or more context-dependent default response protocols 601, 602, 603, 604, 605 and (optionally) to two or more context-dependent response protocols 611, 612, 613, 614, 615 associated with a single party identifier 610 (in a many-to-one association by virtue of being in the same row 661 or other record, e.g.). Likewise as shown in row 662, party identifier 620 corresponds to one or more response protocols 621, 622, 623, 624, 625 (e.g. suitable in one or more respective contexts 651, 652, 653, 654, 655) and party identifier 630 corresponds to one or more response protocols 631, 632, 633, 634, 635 depending upon context as described below. Medium 600 may likewise include one or more instances of digitally expressed periods 661, 662. Medium 600 may likewise include one or more instances of datastructures 680 (content suitable for routing as a wireless signal 497, e.g.) that map zero or more account-specific headers 671 (identifying a single party 403, e.g.) to a network routing tag 672 (e.g. an independent identifier 151 listed in visitor location register 364 or home location register 463, e.g.) associated with a series of data items 681, 682, 683 (e.g. user data). One or more instances of such media 600 may be implemented, for example, in mobile device 440 or in a server 428 accessible to device 440.

Figure 7:
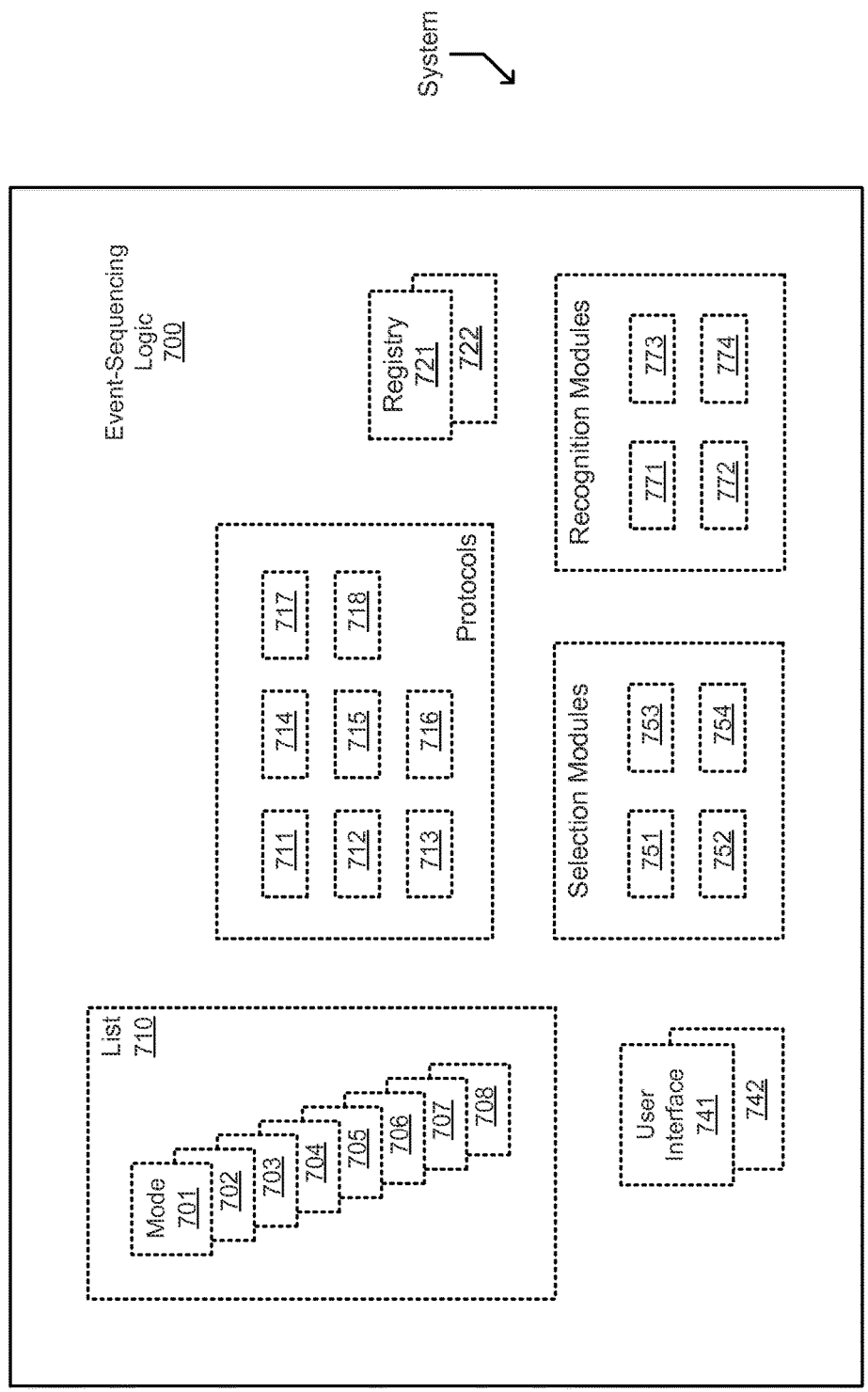
FIG. 7 depicts an exemplary environment in which one or more technologies may be implemented, including a schematic depiction of event-sequencing logic.

With reference now to FIG. 7, a system is shown in schematic form comprising event-sequencing logic 700 (transistor-based circuitry including electrical node sets each having a voltage configuration that manifests an informational structure, e.g.). Event-sequencing logic 700 may include one or more instances of modes 701, 702, 703, 704, 705, 706, 707, 708 (arranged in a list 710, e.g.); of protocols 711, 712, 713, 714, 715, 716, 717, 718; of registries 721, 722; of user interfaces 741, 742; of selection modules 751, 752, 753, 754; or of recognition modules 771, 772, 773, 774. For example, such components of event-sequencing logic 700 may each comprise a pointer or other operational parameter providing access to or otherwise triggering a selective execution of software executable by one or more processors 580, e.g.). One or more instances of event-sequencing logic 700 may be implemented, for example, in a mobile device 322, 440 configured to receive or responsively participate in one or more communications 531-535 as described below.

In some contexts, as further described below, one or more such modes may comprise conditional response protocols like those of FIG. 6. When an incoming signal (comprising one or more communications 531-535, e.g.) has a signal source identification tag (a caller identification field defining which of two or more contexts 651-654 will apply, e.g.) and a signal target identification tag (account-specific header 671 defining one or more party identifiers 610, 620, 630 specify a suitable recipient, e.g.) at mobile device 440, for example, one or more recognition protocols 772 may use both of these tags as co-determinants for selecting among several response protocols 611-613, 631-633. In some contexts, for example, only some of the contingently-invoked response protocols include an audible component (sound 573, e.g.).

Figure 8:
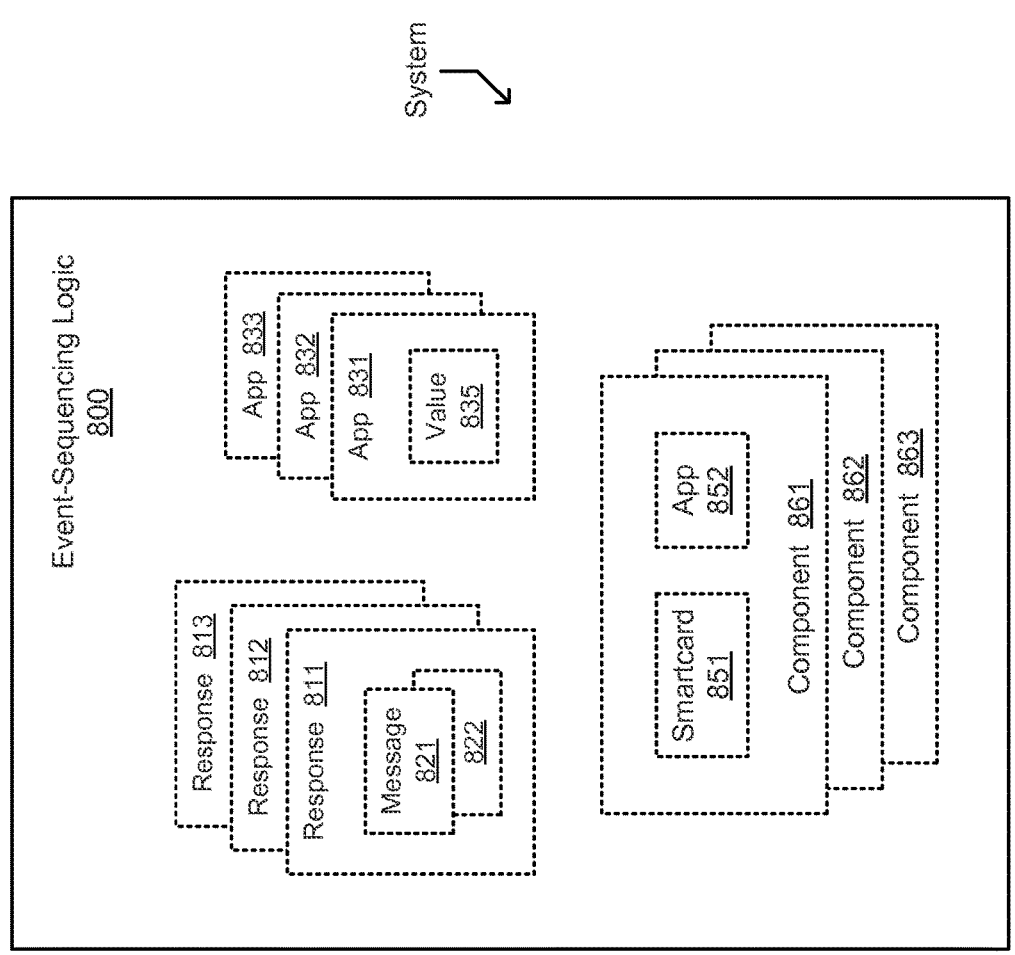
FIG. 8 depicts an exemplary environment in which one or more technologies may be implemented, including a schematic depiction of event-sequencing logic (a schematic depiction of an electronic or electromechanical apparatus implemented as circuitry, e.g.).

With reference now to FIG. 8, a system is shown in schematic form comprising event-sequencing logic 800 (transistor-based circuitry including electrical node sets each having a voltage configuration that manifests an informational structure, e.g.). Event-sequencing logic 800 may include one or more instances of messages 821, 822 or other automatic and conditional responses 811, 812, 813; of values 835 or other features of apps 831, 832, 833; or of installable device components 861, 862, 863 (a smartcard 851 or downloadable app 852, e.g.). One or more instances of event-sequencing logic 800 may be implemented, for example, in a mobile device 322, 440 configured to receive or responsively participate in one or more communications 531-535 as described below.

Figure 9:
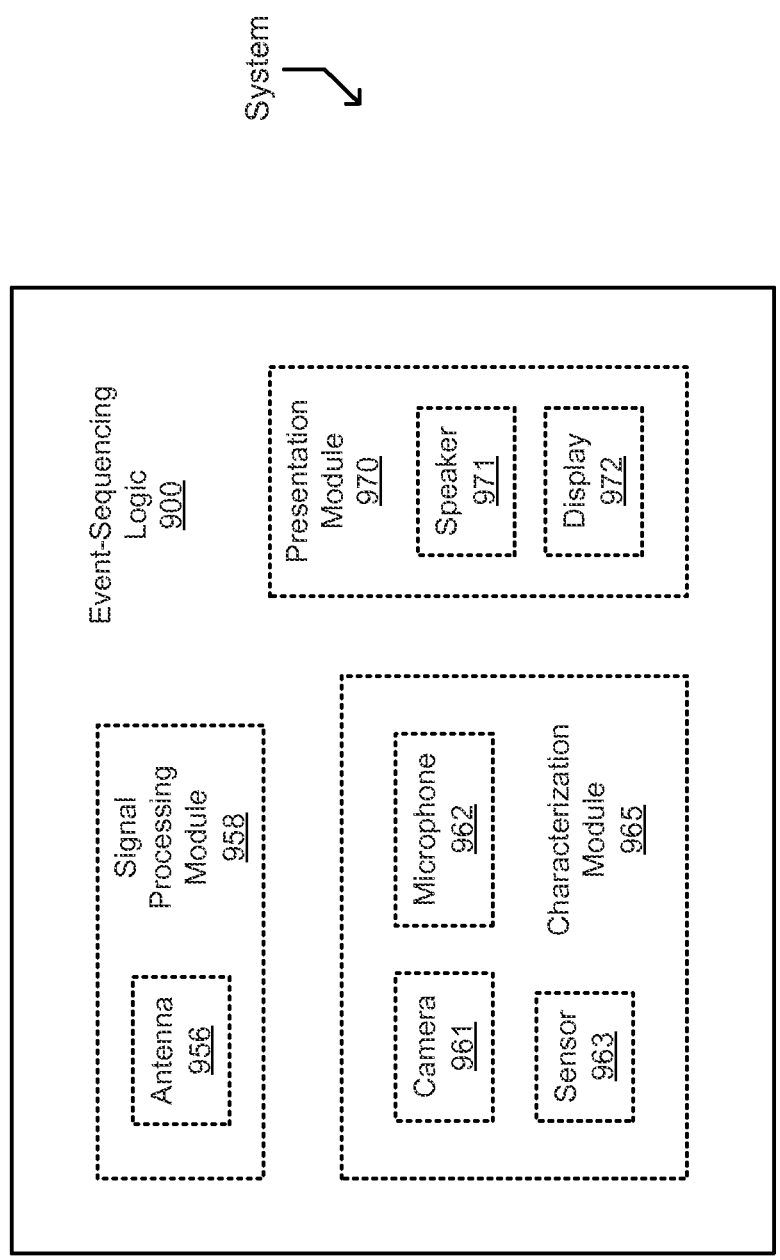
FIG. 9 depicts an exemplary environment in which one or more technologies may be implemented, including a schematic depiction of event-sequencing logic.

With reference now to FIG. 9, a system is shown in schematic form comprising event-sequencing logic 900 (transistor-based or other integrated circuitry 330 including electrical node sets each having a voltage configuration that manifests an informational structure, e.g.). Event-sequencing logic 900 may include one or more instances of signal processing modules 958 (including one or more instances of an antenna 956 configured to receive a wireless signal 397, 497, e.g.); of characterization modules 965 (including one or more cameras 961, microphones 962, or other sensors 963, e.g.); or of presentation modules 970 (including one or more speakers 971 or displays 972, e.g.). One or more instances of event-sequencing logic 900 may be configured to interact with one or more parties 401, 402 in a vicinity (of effective optical or auditory detection, e.g.) of device 440.

Figure 10:
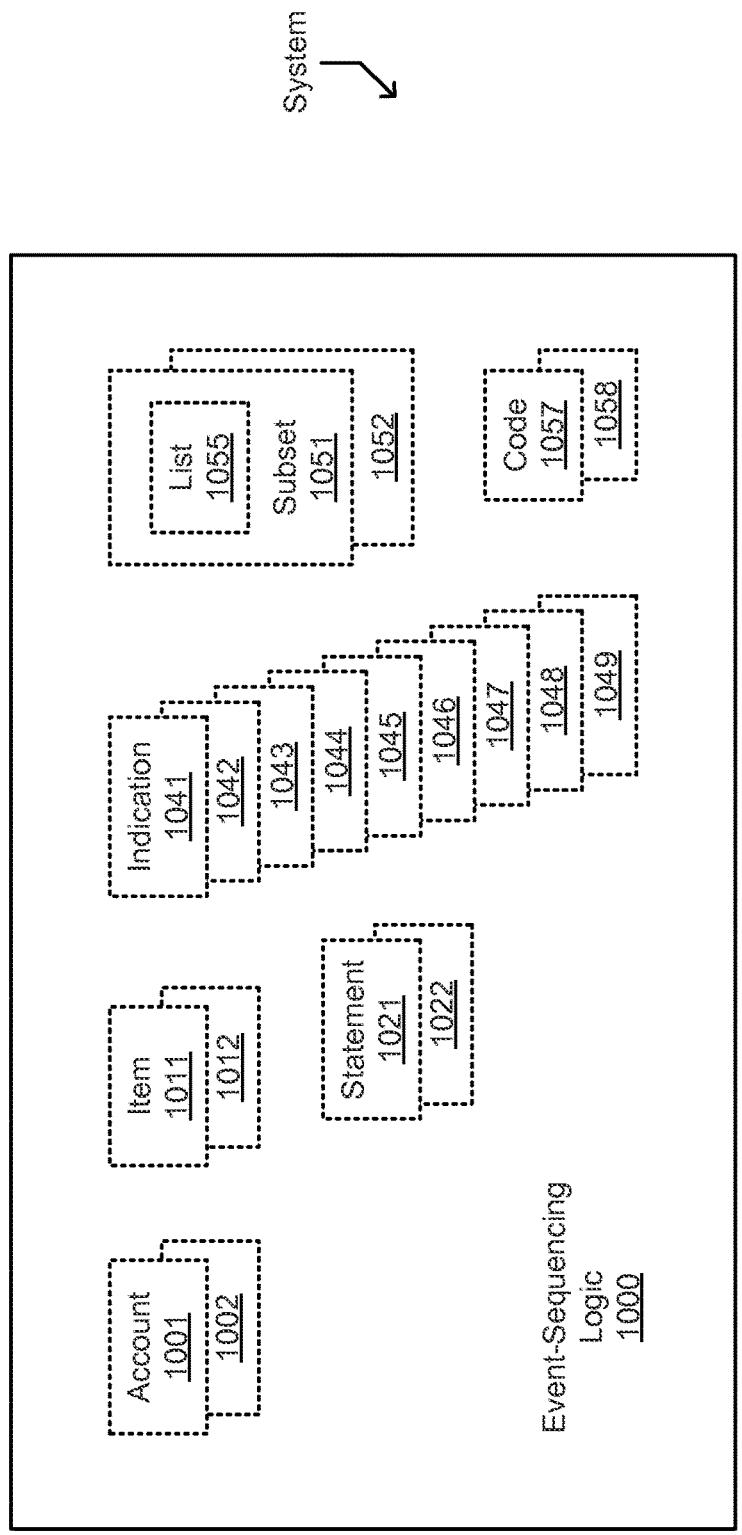
FIG. 10 depicts an exemplary environment in which one or more technologies may be implemented, including a schematic depiction of event-sequencing logic (a schematic depiction of an electronic or electromechanical apparatus implemented as circuitry, e.g.).
Figure 11:
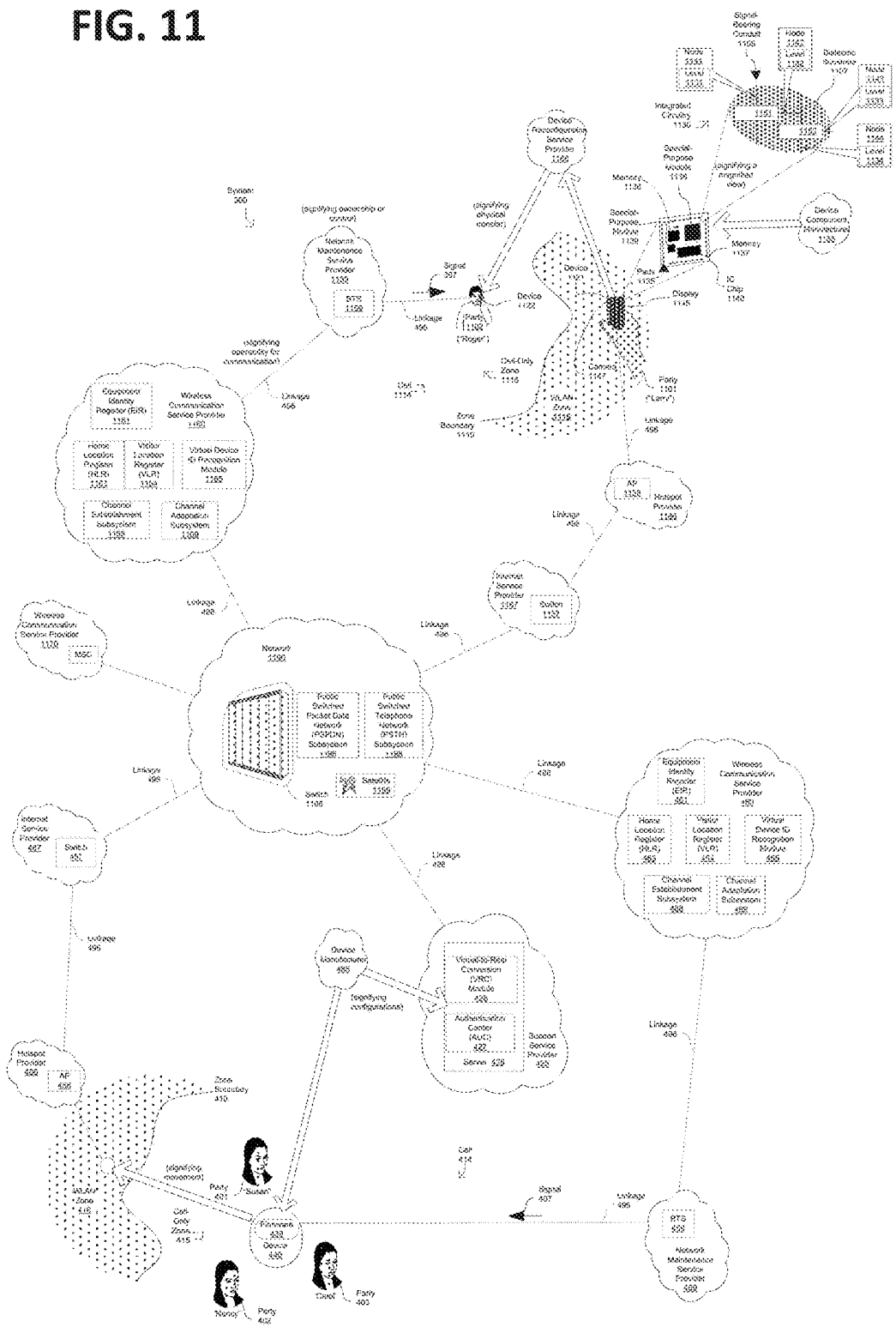
FIG. 11 depicts an environment in which several entities may interact via a network.

With reference now to FIG. 10, a system is shown in schematic form comprising event-sequencing logic 1000 (transistor-based circuitry including electrical node sets each having a voltage configuration that manifests an informational structure, e.g.). Event-sequencing logic 1000 may include one or more instances of accounts 1001, 1002; of media items 1011, 1012; of statements 1021, 1022; of indications 1041, 1042, 1043, 1044, 1045, 1046, 1047, 1048, 1049; of subsets 1051, 1052 (comprising a list 1055, e.g.) or of authorization codes 1057, 1058. One or more instances of event-sequencing logic 1000 may be implemented, for example, in network 390 or in device 440.

One or more dependent-to-independent conversion modules (DICM) 111, 112 may be applied for identifying a single independent identifier 151 corresponding to any given dependent identifier 152. In some contexts this can be implemented without any expansion of existing equipment identity registers 361, 461; home location registers 363, 463; or visitor location registers 364, 464. In some variants, for example, DICM 111 may implement such conversion simply by rounding down or by selecting the next-lower network routing tag (comprises a real mobile number 120 or similar independent identifier 151, e.g.) listed in HLR 363 or VLR 364 (e.g. by selecting "206-555-2460" as the highest listed value not exceeding "206-555-2461"). This can occur, for example, in a context in which support service provider 425 assigns a block of virtual numbers (a range 158 of several, e.g.) in association with a given independent identifier 151 (in the same row 154, e.g.).

In association with a network 390 that facilitates wireless and other interpersonal communications, support service provider 425 establishes multiple dependent identifiers 152 (hundreds or thousands, e.g.) into one or more groups 201, 202, 203. The identifiers within each group (range 158, e.g.) have one or more shared intrinsic attributes 221, 222, 223, 224, 225, 226. (Each such attribute is "shared" in that it describes a group of two or more such identifiers and "intrinsic" in that determining whether an identifier has the attribute does not require access to any central directory or other extrinsic source.) Each such dependent identifier corresponds to a virtual entity (device or party, e.g.) suitable for receiving or responding to communications. Support service provider 425 broadcasts one or more such attributes 221-226 (whichever ones are in effect, e.g.) so that other communication service or product providers can distinguish identifiers (of a communication initiator or recipient, e.g.) that satisfy an attribute from those that do not. One or more dependent identifiers 152 (alphanumeric sequences or other digital values in a dependent identifier range 158 of several consecutive values, e.g.) have attribute 221 if and only if the last five digits of each form a number that falls between 24400 and 25999. Likewise one or more dependent identifiers 152 have attribute 222 if and only if none of the characters thereof (letters or digits, e.g.) is in a predefined "disqualifying expression" list 251 (e.g. a "5" or "9"). Likewise one or more dependent identifiers 152 have attribute 223 if and only if the last three digits form a number not evenly divisible by N (with N being an integer greater than 1 and less than 9 and the 3-digit number having a nonzero remainder when divided by N, e.g.). Likewise one or more dependent identifiers 152 have attribute 224 if and only if the last two digit-pairs in a numerical portion of the identifier can be multiplied together to form a product between A and B (with 44<A<444 and 444<B<4444, e.g.). This can occur, for example, in a context in which one or more such intrinsic attributes 221-226 (or combinations thereof) can be used as determinants 271-273 (each defining a prerequisite 261 or exception 262, e.g.) of a readily disseminated protocol 267 that is effective for determining whether there is any substantial likelihood (a likelihood of about 1% or more, e.g.) that a communication recipient identifier 205 (a mobile number or other unique address, e.g.) is actually a dependent identifier 152 (virtual device identifier, e.g.); in which a negative determination effectively establishes that the communication recipient identifier 205 is actually not a dependent identifier 152; in which such a determination would otherwise require protocol 267 to include consulting an extrinsic source (a central lookup table residing on a server 428 at a central facility maintained by support service provider 425, e.g.) for every communication routed through network 390; and in which a large majority of such communications require no such consultations by virtue of protocol 267 being implemented in a local instance (within a server or mobile device along a primary channel between or among participants to a communication, e.g.). In some contexts, moreover, an app 831 implementing protocol 267 will maintain a local value 835 indicative of when it was installed or first invoked and will automatically reconfigure itself after an expiration of a set period (of X days with 4<X<444, e.g.) by retrieving one or more new parameters 211, 212, 213, 214 (new values for one or more A or B or N or X, e.g.) or a replacement protocol 268 (implemented in an app 832 from server 426, e.g.).

As described herein, interpersonal communications 531-535 may be unidirectional or bidirectional. In light of teachings herein numerous existing techniques may be applied for configuring special purpose circuitry or other structures effective for implementing a unidirectional communication as described herein without undue experimentation. See, e.g., U.S. Pat. No. 8,391,930 ("Method and system for using user-selected alert patterns"); U.S. Pat. No. 8,352,872 ("Geographic location notification based on identity linking"); U.S. Pat. No. 8,346,879 ("Detecting conflicts in email messages"); U.S. Pat. No. 8,243,887 ("Identification of notifications in a mass notification system"); U.S. Pat. No. 8,238,869 ("Lifesaver personal alert and notification device"); U.S. Pat. No. 8,145,566 ("Method and system for notifying customers of transaction opportunities"); U.S. Pat. No. 7,961,076 ("Methods and apparatuses for remote control of vehicle devices and vehicle lock-out notification").

In light of teachings herein numerous existing techniques may be applied for configuring special purpose circuitry or other structures effective for establishing a bidirectional communication as described herein without undue experimentation. See, e.g., U.S. Pat. No. 8,358,975 ("Signaling over cellular networks to reduce the Wi-Fi energy consumption of mobile devices"); U.S. Pat. No. 8,295,352 ("Process for delivering a video stream over a wireless bidirectional channel between a video encoder and a video decoder"); U.S. Pat. No. 8,244,228 ("Method and apparatus for providing a mobile wireless local area network"); U.S. Pat. No. 8,160,304 ("Interactive systems and methods employing wireless mobile devices"); U.S. Pat. No. 8,049,664 ("Multi-band, multi-channel, location-aware communications booster"); U.S. Pat. No. 8,004,556 ("Conference link between a speakerphone and a video conference unit"); U.S. Pat. No. 7,761,505 ("System, method and computer program product for concurrent performance of video teleconference and delivery of multimedia presentation and archiving of same"); U.S. Pat. No. 7,254,123 ("Control of a wireless conference telephone system").

A party 401 ("Susan") buys a new mobile device 440 to share with one or more other parties 402, 403 ("Nancy" and "Carol") who work or live in a common facility (business or residence, e.g.). As configured by an OEM (device manufacturer 485, e.g.), mobile device 440 initially contains a party identifier list 650 and a contingent default protocol 711. Contingent default protocol 611 effectively designates (in row 660, e.g.) two or more response protocols 601, 602 each of which is only invoked for an incoming communication 531 (comprising call 521 or text 522 or other content 523, e.g.) that does not include any particular party identifier 610, 620, 630 (a recognized entity to whom the communication is targeted, e.g.). In that state, device-executable firmware 439 within device 440 responds to incoming communications in a manner that is outwardly conventional (by causing a speaker aboard device 440 to sound a "traditional ring" sound 571 in a context 651 of an incoming phone call 521 or to sound a "simple chime" sound 572 in a context 652 of an incoming text 522, e.g.).

Susan configures shared mobile device 440 for a purpose of having fewer devices than device users in her household. Mobile device 440 is identified by a network routing tag 672 (e.g. a phone number of "206-555-2460") by which Susan may receive a communication 531 (a call 521 or text 522 comprising a wireless signal 497 that includes that network routing tag 672, e.g.) conventionally. Alternatively or additionally, wireless signal 497 may include one or more account-specific headers 371 each associated with one or more user data items 681, 682, 683 as described herein. In a context in which an incoming communication is targeted to less than all users of device 440, for example, account-specific header 371 may be a digital value indicating a particular individual (a virtual cell phone number of "206-555-2461" belonging to Susan, e.g.) or a particular group 204 of individuals (a virtual cell phone number of "206-555-2465" shared among several, e.g.).

Soon after purchase, Susan reconfigures device 440 to identify herself (using party identifier 610, e.g.) in association with several contingent response protocols 611-615 that she prefers, respectively corresponding to a recognized context 651-655 (each symbolized as a column, e.g.). In response to a context 653 of an anonymous incoming communication 531, for example—one that does not identify any initiator/sender—she expresses her selection of a response protocol 613 of passive response—sending a call 521 directly to voice mail or likewise silently receiving other instances of such incoming communications 531. This can occur, for example, in a context in which a range of virtual mobile numbers 121-124 (e.g. "206-555-2461" et seq.) are each used for identifying a respective party 401, 402, 403 and in which such virtual mobile numbers all correspond to a single real mobile number 120 (e.g. "206-555-2460") that uniquely identifies mobile device 440.

In a first network configuration, wireless communication service provider 360 does not include a virtual device identifier recognition module 365. Rather, the "virtual" identifiers associated with mobile device 440 are implemented as real phone lines associated with server 428. When party 302 ("Roger") initiates a communication (via wireless communication service provider 360) by dialing a mobile number of "206-555-2462," that communication is routed to support service provider 425. VRC module 426 completes the call by establishing a new channel (from server 428 and via BTS 459, e.g.) to device 440 and extending the incoming communication from party 302 along that new channel to device 440.

In a second network configuration, wireless communication service provider 360 includes a virtual device identifier recognition module 365. The "virtual" identifiers associated with mobile device 440 are implemented in a lookup table resident in VRC module 426 (resident in server 428 or network 390, e.g.). When party 302 ("Roger") initiates a communication (by dialing a mobile number of "206-555-2462," e.g.) that communication is redirected to the corresponding "real" destination identifier (an independent identifier 151 implemented as a "real" mobile number of "206-555-2460," e.g.).

With either of these network configurations, a wireless signal 497 arriving at mobile device 440 includes information similar to that of datastructure 680, including a network routing tag ("206-555-2460," e.g.) by which device 440 has been identified and with either an account-specific header (e.g. comprising one or more specific party identifiers 610, 620, 630) that identifies a person or as a recipient-nonspecific incoming call (signaling one or more response protocols 601-605 along row 660, e.g.). This provides device 440 with information about which of two or more parties 401, 402, 403 is intended to receive the communication.

Firmware 439 includes one or more features configured to facilitate sharing mobile device 440 among two or more parties 401, 402, 403. Two of the parties 401, 402 who use device 440 may be logged onto device 440 concurrently, even in a context in which only one is actively using device 440. A first communication 531 (content 523 resulting from real-time input from a party 301 using device 321, e.g.) comprises a wireless signal 497 that includes real mobile number 120. A recipient recognition module 771 (within an incoming communication processing module 581 aboard mobile device 440) determines that no party indication tag is present among the components (in datastructure 680, e.g.) of the communication 531 and therefor applies one or more default response protocols 601-605 (effectively routing the communication 531 to a "default" user, e.g.).

In light of teachings herein numerous existing techniques may be applied for configuring special purpose circuitry or other structures effective for determining which one or more users are currently recognized or online as described herein without undue experimentation. See, e.g., U.S. Pat. No. 8,443,420 ("System for communicating with a mobile device server"); U.S. Pat. No. 8,341,246 ("Personal content server apparatus and methods"); U.S. Pat. No. 8,266,313 ("Live media subscription framework for mobile devices"); U.S. Pat. No. 8,261,090 ("Login to a computing device based on facial recognition"); U.S. Pat. No. 8,166,524 ("Method and system for the authentication of a user of a data processing system"); U.S. Pat. No. 8,060,109 ("Authorized location reporting mobile communication system"); U.S. Pat. No. 7,844,684 ("Live media captioning subscription framework for mobile devices"); U.S. Pat. No. 7,693,752 ("Mobile commerce framework"); U.S. Pat. No. 7,421,477 ("Real-time media captioning subscription framework for mobile devices"); U.S. Pat. No. 7,373,384 ("Short message (SMS) storage system"); U.S. Pat. No. 7,353,016 ("Call intercept methods, such as for customer self-support on a mobile device").

Initially a communication that arrives at mobile device 440 without identifying any parties 401, 402 who are currently logged in immediately triggers a response protocol 604 by which module 583 sends a "no recipient available" response message to the device 321 via which the communication originated. As a result of no default user being designated (or of a currently-designated default user being offline), therefore, the first communication 531—having a datastructure lacking any party indication tag—invokes the module 583 that implements response protocol 604.

A second communication 532 later arrives at mobile device 440 with a real mobile number 120 that uniquely identifies mobile device 440, but this time comprising a wireless signal 497 having a party identification tag (e.g. an occurrence of "63") that specifically identifies party 403 ("Carol"), who is still not logged onto mobile device 440. As a result of party 403 still being offline, the second communication 532 invokes a response protocol 542 by which module 582 sends a party-specific response message (e.g. "Carol is not available" sent as a real-time response to party 302) to the device 322 that originated the second communication 532.

At least one independent identifier 151 (e.g. a real mobile number 120) and at least one dependent identifier 152 (e.g. one or more virtual mobile numbers 121-124 corresponding to real mobile number 120) are commonly assigned to mobile device 440 indefinitely or for a fixed period 575 (of a week or more, e.g.) by installing a component 861 (smartcard 851 or app 852, e.g.) associated with at least one virtual mobile number 122, 123 (in a one-to-one or one-to-many association, e.g.) into a mobile device uniquely associated with at least one real identifier (e.g. a real mobile number 120 or other independent identifier 151). Susan configures an on-board user directory 561 so that each of two or more parties 401, 402, 403 who use device 440 corresponds with a single respective one of the available dependent identifiers 152 and with a corresponding list 710 of operating modes (e.g. defined by a corresponding row 661, 662, 663 of response protocols). Each instance of such lists 710 includes one or more selectively configurable operating modes (response protocols 635, e.g.) as described below.

By one or more such techniques, an invocation of firmware 430 causes mobile device 440 to switch between a general purpose operating mode 703 (appropriate when a privileged party 401 is identified as a primary current user, e.g.) and a limited purpose operating mode 707 (appropriate when privileged party 401 is not in possession of mobile device 440, e.g.). Device 440 is configured to be updated by a primary user (party 401) so as to provide a comprehensive registry 721 of current users of device 440. This can occur, for example, in a context in which a virtual mobile number 124 is exclusively associated with a mobile device 440; in which the primary user previously associated the virtual mobile number 124 with a specific party; in which the primary user later configured comprehensive registry 721 to dissociate the virtual mobile number 124 from the specific party; in which such modifications to comprehensive registry 721 are implemented locally (within device 440, e.g.); and in which subsequent communications directed to the virtual mobile number 124 would otherwise be mishandled (handled according to one or more generic response modes 704, 705 not in accord with preferences of the primary user, e.g.).

Initially all charges incurred by mobile device 440 (for usage or otherwise as authorized by Susan, e.g.) are assigned to an account 1001 (expressed in minutes or dollars or other digital units, e.g.) associated with a particular user (Susan, e.g.). Mobile device 440 is configured to limit charges to account 1001 by using WLAN within the facility partly based upon being in operating mode 707 and partly based on being in overlap zone 376.

In light of teachings herein, numerous existing techniques may be applied for configuring special-purpose circuitry or other structures effective for cost allocations as described herein without undue experimentation. See, e.g., U.S. Pat. No. 8,380,188 ("System and method for temporarily accessing another user's service"); U.S. Pat. No. 8,311,532 ("Method and system for enabling personalized shared mobile phone usage"); U.S. Pat. No. 8,086,239 ("Infrastructure for wireless telecommunication networks"); U.S. Pat. No. 8,045,957 ("Computer program product to indicate a charge for a call"); U.S. Pat. No. 7,965,997 ("System and method to support multiple wireless accounts for a given subscriber"); U.S. Pat. No. 7,813,716 ("Method of providing information to a telephony subscriber"); U.S. Pat. No. 6,788,927 ("Financing party payment for calls with a wireless subscriber"); U.S. patent application Ser. No. 13/954,756 ("Protocols for facilitating broader access in wireless communications"); U.S. Pat. Pub. No. 2012/0202454 ("System and method for authorizing and monetizing collect cellular telephone calls"); U.S. Pat. Pub. No. 2011/0191205 ("Portable communicator"); U.S. Pat. Pub. No. 2009/0227229 ("Method and system for enabling personalized shared mobile phone usage"); U.S. Pat. Pub. No. 2008/0167045 ("Service handover control apparatus using an end-to-end service handover and method using the apparatus"); and U.S. Pat. Pub. No. 2005/0190902 ("Network support for billing customer calls according to tailored billing lists").

As a privileged party 401, Susan may selectively disable a particular operating mode 706 (establishing communications from device 440 via access point 350, e.g.) whenever another party 402 (specified by Susan) is using device 440 (to trigger enhanced record-keeping of such communications, e.g.).

One or more incoming communications that include a party identifier 620 (an account-specific header 671 that corresponds specifically to Carol, e.g.) may invoke a special-purpose incoming context differentiation module 584 that operates in one mode 624 (sounding Carol's ring, e.g.) if Carol is apparently present and in another mode 625 (permitting a voice or text message to be passed to Carol silently, e.g.) otherwise. This can occur, for example, in an implementation in which Carol has configured several such response protocols 621-625; in which module 584 includes a camera 961 operably coupled to a face recognition module or a microphone 962 operably coupled to a voice recognition module; and in which Carol has expressed a preference for such contingently-audible notifications. Alternatively or additionally, such conspicuous responses may depend upon one or more of (1) whether another party is apparently present; (2) whether a particular device 321 or other entity (party 301, e.g.) apparently initiated the communication; or (3) other such communication provenance data or other determinants described herein.

In light of teachings herein, numerous existing techniques may be applied for configuring special-purpose circuitry or other structures effective for comparing a face or other informational element with a database of similar items as described herein without undue experimentation. See, e.g., U.S. Pat. No. 8,261,090 ("Login to a computing device based on facial recognition"); U.S. Pat. No. 8,000,528 ("Method and apparatus for authenticating printed documents using multi-level image comparison based on document characteristics"); U.S. Pat. No. 7,949,191 ("Method and system for searching for information on a network in response to an image query sent by a user from a mobile communications device"); U.S. Pat. No. 7,908,518 ("Method, system and computer program product for failure analysis implementing automated comparison of multiple reference models"); U.S. Pat. No. 7,856,137 ("Apparatus and method for verifying image by comparison with template image"); U.S. Pat. No. 7,831,559 ("Concept-based trends and exceptions tracking"); U.S. Pat. No. 7,787,693 ("Text detection on mobile communications devices"); U.S. Pat. No. 7,644,055 ("Rule-based database object matching with comparison certainty"); U.S. Pat. No. 7,443,787 ("Cluster system, cluster member, and failure recovery method and program thereof"); U.S. Pat. No. 6,424,729 ("Optical fingerprint security verification using separate target and reference planes and a uniqueness comparison scheme"); U.S. Pat. No. 6,167,398 ("Information retrieval system and method that generates weighted comparison results to analyze the degree of dissimilarity between a reference corpus and a candidate document"); U.S. Pat. No. 6,134,014 ("Apparatus and method of inspecting phase shift masks using comparison of a mask die image to the mask image database").

In light of teachings herein numerous existing techniques may be applied for configuring special purpose circuitry or other structures effective for implementing a timing or other comparison as described herein without undue experimentation. See, e.g., U.S. Pat. No. 8,325,901 ("Methods and apparatus for providing expanded telecommunications service"); U.S. Pat. No. 8,321,727 ("System and method responsive to a rate of change of a performance parameter of a memory"); U.S. Pat. No. 8,320,261 ("Method and apparatus for troubleshooting subscriber issues on a telecommunications network"); U.S. Pat. No. 8,315,622 ("Motion adaptive communications device and integrated circuits for use therewith"); U.S. Pat. No. 8,311,579 ("Multi-mode mobile communication device with motion sensor and methods for use therewith"); U.S. Pat. No. 8,295,395 ("Methods and apparatus for partial interference reduction within wireless networks"); U.S. Pat. No. 8,290,509 ("Deactivation system and method for a transferable device"); U.S. Pat. No. 8,264,953 ("Resilient data communications with physical layer link aggregation, extended failure detection and load balancing"); U.S. Pat. No. 8,224,349 ("Timed fingerprint locating in wireless networks"); U.S. Pat. No. 8,195,478 ("Network performance monitor"); U.S. Pat. No. 8,184,580

("Data packet communication scheduling in a communication system"); U.S. Pat. No. 7,881,992 ("Methods and systems for processing and managing corporate action information"); and U.S. Pat. No. 7,853,268 ("GPS enabled cell phone location tracking for security purposes").

In light of teachings herein numerous existing techniques may be applied for configuring special purpose circuitry or other structures effective for signaling an availability or other status as described herein without undue experimentation. See, e.g., U.S. Pat. No. 8,306,005 ("Dynamic communication and method of use"); U.S. Pat. No. 8,289,210 ("Location measurement acquisition adaptive optimization"); U.S. Pat. No. 8,271,626 ("Methods for displaying physical network topology and environmental status by location, organization, or responsible party"); U.S. Pat. No. 8,260,896 ("Monitoring business machines using a mesh network on field nodes"); U.S. Pat. No. 8,249,616 ("Satellite (GPS) assisted clock apparatus, circuits, systems and processes for cellular terminals on asynchronous networks"); U.S. Pat. No. 8,208,489 ("Method for reporting downstream packet resequencing status in cable modem"); U.S. Pat. No. 8,195,198 ("System, method and apparatus for protecting privacy when a mobile device is located in a defined privacy zone"); U.S. Pat. No. 8,108,501 ("Searching and route mapping based on a social network, location, and time"); U.S. Pat. No. 8,059,788 ("Telephone software testing system and method"); U.S. Pat. No. 8,059,011 ("Outage notification system"); U.S. Pat. No. 8,037,126 ("Systems and methods of dynamically checking freshness of cached objects based on link status"); U.S. Pat. No. 8,010,230 ("Robotic ordering and delivery apparatuses, systems and methods"); U.S. Pat. No. 8,005,911 ("Systems for communicating current location information among mobile internet users and methods therefor"); U.S. Pat. No. 7,860,648 ("Map display system and method"); and U.S. Pat. No. 7,392,017 ("Assessing wireless network quality").

In light of teachings herein numerous existing techniques may be applied for configuring special purpose circuitry or other structures effective for generating and using provenance data as described herein without undue experimentation. See, e.g., U.S. Pat. No. 8,412,946 ("Trustworthy timestamps and certifiable clocks using logs linked by cryptographic hashes"); U.S. Pat. No. 8,406,753 ("System and method for generating a location estimate using uniform and non-uniform grid points"); U.S. Pat. No. 8,369,871 ("System and method for mobile device self-location"); U.S. Pat. No. 8,346,282 ("Method and system for locating mobile stations using call measurement data"); U.S. Pat. No. 8,284,100 ("Providing indoor location, position, or tracking of a mobile computer using sensors"); U.S. Pat. No. 8,265,655 ("Procedure to increase position location availability"); U.S. Pat. No. 8,301,375 ("Interface for a GPS system"); U.S. Pat. No. 8,068,836 ("Method and device for transferring an ongoing communication in which a mobile terminal is involved between a first and a second base stations and wherein one of the base stations is located in a moving conveyance"); U.S. Pat. No. 8,032,149 ("Tasking and reporting method and implementation for wireless appliance location systems"); U.S. Pat. No. 7,519,373 ("System and method for geo-location of mobile appliances using diverse standard tasking and reporting").

A user directory 561 aboard mobile device 440 is configured by a protocol 543 that disassociates a secondary user (party 402, e.g.) from a virtual identifier (mobile number 124, e.g.) with which she was previously associated. Selection module 753 implements a protocol for determining which of the two or more parties 401, 402, 403 are intended to receive an incoming communication (coming into device 440, e.g.). Protocol 543 results in a device-specific party-nonspecific failure message 821 (a notification resident in firmware 439 that "this virtual number is associated with a private entity but is not currently assigned," e.g.) being sent as a real-time response 812 to a subsequent incoming communication 534 unless an additional protocol 544 associating a virtual identifier (e.g. "206-555-2462") with a device-specific party-specific failure message 822 ("Nancy is not currently accepting communications at this number or address," e.g.) has been implemented.

In another scenario, a mobile device 322 (implementing device 400 of FIG. 4, e.g.) acquired by another party 302 ("Roger") is retrofitted (by Roger or a device reconfiguration service provider 388, e.g.) with a jailbreak or other rooting protocol 718 that includes installing a substitute subscriber identity module (SIM) 472 or other components 862 to facilitate device virtualization or device sharing as described herein. Such a substitute SIM 472 may include a recipient indicator selection module 751 or may include an authorization code 1057 configured to cause update module 171 to download recipient indicator selection module 751 (from a server 428 remote from mobile device 322, e.g.). As a result of such configuration, mobile device 322 thereafter includes an incoming wireless signal processing protocol 716 and one or more other mobile device protocols 717 as described herein for facilitating mobile device sharing (of device 322 among several users, e.g.) as variously described herein. This permits one or more processors aboard shared mobile device 322 to respond to a recipient-selective incoming wireless signal 497 intelligently as described herein.

In some variants account-specific header 371 may be a local identifier of several bits (a 3-bit binary value of "001" or an 8-bit binary value of "01111101", e.g.) that uniquely identifies Roger locally within a context of device 322 (but not in network 390, e.g.). This permits mobile device 322 to behave responsively to which of several user sets (numbered 0 to 63, e.g.) are active (logged in or recently having used device 322, e.g.) or indicated (by a communication or user configuration protocol 719, e.g.). In a context in which a user designates a subset 1051 of users (by providing a list 1055 that identifies users "001" and "003" but not others, e.g.), for example, a single device-detectable user configuration input indication 1042 (key press or utterance, e.g.) may cause an app 833 or media item 1011 (audio recording, e.g.) to be installed and thereby made selectively accessible for the user-designated subset 1051 of users but not for any other user of device 322. Likewise an interpersonal communication 701 directed to a particular user (e.g. a text 522 to Roger's virtual cell phone number) may include one or more items 681 of interpersonal message content 523 as well as one or more items 682 of protocol selection content 523 (a parameter directing device 322 not to manifest the communication 701 in the presence of any users other than the recipient identified by account-specific header, e.g.). Alternatively or additionally one or more such items M382 may identify the device user (party 402, e.g.) who initiated the communication 701.

In another context, an indicator selection module 752 aboard device 322 implements a tag recognition protocol 715 by causing mobile device 322 to present a visible or audible recipient indication 1041 (one or more of displayed text or a voice saying "call for Roger" via a speaker 971 or display 972 of device 322 e.g.) selected partly based on the one or more party indication tags (an account-specific header 371 of "1" or "61," e.g.) from among several such indications 1043-1045 that reside in the mobile device.

In some variants of event sequencing described herein, Roger configures shared mobile device 322 so as to accommodate a guest user temporarily (Larry receiving or sending messages via device 322 for a time period 661 specified by Roger of less than a month, e.g.) or so as to monitor or control a guest user access (preventing Larry from accessing one or more protocols 712, 713 or data items resident on device 322 and accessible to Roger, e.g.).

In some contexts, for example, protocol 713 may enable device 322 to access WLAN service (via an access point within a shared residence, e.g.) that not all users registered to device 322 can invoke. That way, for example, a more-privileged user (Roger, e.g.) can send or receive messages from WLAN-only zone 374 (a cellar, e.g.) within which at least one registered user (Larry, e.g.) cannot. In some contexts, such other users may need to bring mobile device 322 to a cell-only zone 315 (a balcony within an effective range of a cell tower, e.g.) to send or receive interpersonal communication. In other contexts, Roger may selectively disable other users' outgoing communications via device 322 or may selectively permit one or more other registered users to access incoming communications via device 322 only after reviewing one or more user data items 681-683 associated with the incoming wireless signal 397. In some contexts a more-privileged user (an owner of an account 1002 associated with device 322, e.g.) can likewise control access to other cost-determinant resources. Such resources may, for example, include (1) a metered data download protocol 714 charged to account 1002 or (2) authorization for a charge to account 1002 at least partly based on an affiliation-dependent mobile device (device 440, e.g.) using a cellular linkage in lieu of a WLAN linkage. (As used herein, a device is "affiliation dependent" if and only if it is at least one of an unsubscribed mobile device or a formerly-subscribed mobile device or a formerly-charged mobile device.)

In an instance of event-sequencing logic 900 implementing a mobile device 322, 440 described above, signal processing module 958 receives a wireless signal 397, 497 (via antenna 956, e.g.) including a network routing tag 672 (a phone number 120 identifying the recipient mobile device, e.g.) and one or more account-specific headers 671 (designating one or more parties 302, 402 intended to receive user data, e.g.). The user data may include one or more voice data items 681, graphic image data items 682, or other such message content 523.

One or more selection modules 754 selects a specific-party recipient indication 1047 (a ring tone unique to a caller/recipient pairing, e.g.) from among two or more such indications 1047-1049 according to a registry 722 that contains a record of (a) which parties are known to device 440 and (b) which of those parties are logged into device 440 and (c) which of those parties are apparently present within a detection zone of a camera 961, microphone 962, or other sensor 963. For an incoming communication designating either party 402 (Nancy) or party 403 (Carol), for example, selection modules 754 selects a recipient-party-specific indication (of a sound 573 or text, such as a voice or display message saying "call for Carol" via a presentation module 970 of device 440, e.g.) as a conditional response to either (1) Nancy being offline and Carol being online or (2) Nancy being apparently absent and Carol being apparently present within a detection range (line of sight, e.g.) of characterization module 965. This can occur, for example, in a context in which such party designations take the form of numerical tags ("62" & "63," e.g.) interpreted by a tag recognition protocol 546 (recognizing a call for Susan if a last digit is "1" for Nancy if a last digit is "2" or for Carol if last digit is "3," e.g.).

A communication is initiated by a user input component (a keypad or microphone 962, e.g.) obtaining (from party 302 using device 322, e.g.) an identifier of a first recipient device user ("Carol" or "206-555-2463," e.g.). A determination is made whether the identifier is aliased. If the determination is positive, an aliasing-determination-dependent tag is offset from the identifier of the first recipient device user according to a conversion function (by arithmetic transfer function like "subtracting 3" or by a lookup table, e.g.). If the determination is negative, the aliasing-determination-dependent tag is obtained by assigning an identifier of a first recipient device user as the aliasing-determination-dependent tag ("206-555-2460," e.g.). The communication is established by invoking transistor-based circuitry configured to cause a PSTN selectively to route a message that uniquely identifies the first recipient device user (Carol) to a shared mobile device 440 identified by the aliasing-determination-dependent tag.

In some contexts, Roger (party 302) may implement one or more privacy protocols 712 when directing a communication 535 via a virtual identifier (e.g. calling Carol at "206-555-2463"), such as in a context in which he is concerned that a digital sequence that identifies him will be filtered automatically or manually intercepted (by a hostile party, e.g.). In light of teachings herein, such a protocols may be implemented in various ways. Privacy protocol 712 may (optionally) include, for example, transmitting a false natural language statement 1021 (a statement from Roger like "this is Larry and I urgently need to talk to Nancy" in text or audio format, e.g.) or another indication 1046 misidentifying a user who initiates the communication as another entity.

Alternatively or additionally, a portion of communication 535 (one or more data items 681-683, e.g.) of may be encrypted in a way that effectively prevents an unintended recipient from accessing that portion. In a context in which communication 535 arrives when an intended recipient (party 403 designated by an account-specific header, e.g.) is not logged onto device 440 and another party 401, for example, that portion may be shown as encrypted or hidden entirely. At a later time at which party 403 enters a private key or personal biometric by which she is authenticated (identified by an account-specific header 671, e.g.), that portion is extracted (decrypted using the private key, e.g.) and presented at device 440. Alternatively or additionally, such encryption and decryption for a substantial communication (video call or extended telephone call, e.g.) may be contingent upon two or more parties 302, 403 to the communication using a mobile device 440 that is either currently charging or adequately charged (above a preset threshold that corresponds to a charging state of more than 10%, e.g.)

All of the patents and other publications referred to above are incorporated herein by reference generally—including those identified in relation to particular new applications of existing techniques—to the extent not inconsistent herewith (in each respective latest edition, where applicable). While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A system comprising:
   at least one processor device; and
   one or more instructions that, when implemented in the at least one processor device, program the at least one processor device to perform one or more operations including at least:
   associating a real destination device identifier and one or more virtual device identifiers corresponding to the real destination device identifier with a mobile device including at least configuring the mobile device to be shared by two or more parties corresponding to two or more human beings wherein configuring the mobile device includes obtaining from at least one party of the two or more parties corresponding to two or more human beings the real device identifier, the one or more virtual device identifiers, and one or more response protocols respectively associated with the two or more parties, the one or more response protocols specifying at least one of enablement or disablement of at least one of incoming or outgoing communications associated with the mobile device;
   receiving, from at least one communication device, first communication data including a device identifier;
   determining whether the device identifier in the first communication data includes at least one of the real destination device identifier or the one or more virtual device identifiers;
   transmitting, to the mobile device, second communication data including the real destination device identifier and an indication of whether the device identifier in the first communication data includes at least one of the real destination device identifier or the one or more virtual device identifiers;
   obtaining at least one of image data or voice data sensed in a vicinity of the mobile device associated as a real destination device;
   analyzing the at least one of image data or voice data via at least one of face recognition or voice recognition for determining presence of at least one of the two or more parties in the vicinity of the mobile device;
   determining at least one attribute of a user set of active or indicated users corresponding to at least one of the two or more parties based at least partly on the presence of at least one of the two or more parties in the vicinity of the mobile device;
   selecting a response protocol from the one or more response protocols respectively associated with the two or more parties based at least partly on the at least one attribute of the user set of active or indicated users corresponding to at least one of the two or more parties; and
   causing, at the mobile device, execution of the selected response protocol.

2. The system of claim 1, wherein the associating a real destination device identifier and one or more virtual device identifiers corresponding to the real destination device identifier with a mobile device includes:
   associating a real phone number and one or more virtual phone numbers with the mobile device.

3. The system of claim 1, wherein the receiving, from a at least one communication device, first communication data including a device identifier includes:
   receiving at least one of phone call data or text message data including either the real destination device identifier or at least one of the one or more virtual device identifiers.

4. The system of claim 1, wherein the receiving, from a at least one communication device, first communication data including a device identifier includes:
   receiving wireless communication data including either the real destination device identifier or at least one of the one or more virtual device identifiers.

5. The system of claim 1, wherein the transmitting, to the mobile device, second communication data including an indication of whether the device identifier in the first communication data includes at least one of the real destination device identifier or the one or more virtual device identifiers-includes:
   at least one of:
      transmitting communication data including header data indicating whether the device identifier in the first communication data includes at least one of the real destination device identifier or the one or more virtual device identifiers; or
      transmitting communication data including a user identifier associated with either the real destination device identifier or at least one of the one or more virtual device identifiers.

6. The system of claim 1, wherein the determining at least one attribute of the user set of active or indicated users corresponding to at least one of the two or more parties includes:
   determining whether one or more users are logged in to the mobile device.

7. The system of claim 1, wherein the causing, at the mobile device, execution of the selected response protocol includes:
   providing, to the at least one communication device, an indication that a recipient is unavailable when a user indicated by either the real destination device identifier or at least one of the one or more virtual device identifiers is not logged in based at least partially on the at least one attribute of the user set of active or indicated users corresponding to at least one of the two or more parties.

8. The system of claim 1, wherein the causing, at the mobile device, execution of the selected response protocol includes:
   generating, via the mobile device, at least one ring tone selected according to whether the device identifier in the first communication data includes at least one of the real destination device identifier or the one or more virtual device identifiers and the at least one attribute of the user set of active or indicated users corresponding to at least one of the two or more parties.

9. The system of claim 1, wherein the causing, at the mobile device, execution of the selected response protocol includes:
   providing the communication data to a voicemail system according to whether the communication data included either the real destination device identifier or at least one of the one or more virtual device identifiers and the at least one attribute of the user set of active or indicated users corresponding to at least one of the two or more parties.

10. The system of claim 1, wherein the causing, at the mobile device, execution of the selected response protocol includes:

causing execution of a default response protocol when the first communication data includes at least the real destination device identifier; and causing execution of a user-specific response protocol when the first communication data includes at least one of the one or more virtual device identifiers, wherein the user-specific response protocol is selected based at least partially on the at least one attribute of the user set of active or indicated users corresponding to at least one of the two or more parties.

11. The system of claim 1, further comprising:
at least one of:
receiving context data associated with the mobile device;
receiving communication identification data associated with a source of the first communication data;
receiving, via the mobile device, at least one of image data, video streaming data, video teleconferencing data, streaming multimedia content, or audio data; or
receiving, via the mobile device, at least one of image data video streaming data, video teleconferencing data, streaming multimedia content, or audio data indicative of a presence of a user within a proximity of the mobile device.

12. The system of claim 1, wherein the selecting a response protocol from the one or more response protocols respectively associated with the two or more parties based at least partly on the at least one attribute of the user set of active or indicated users corresponding to at least one of the two or more parties includes:
selecting a response protocol according to context data associated with the mobile device and the at least one attribute of the user set of active or indicated users corresponding to at least one of the two or more parties.

13. The system of claim 1, further comprising:
receiving one or more user inputs associating a first response protocol of the mobile device with the real destination device identifier; and
receiving one or more user inputs associating a second response protocol of the mobile device with at least one of the one or more virtual device identifiers.

14. The system of claim 1, wherein the selecting a response protocol from the one or more response protocols respectively associated with the two or more parties based at least partly on the at least one attribute of the user set of active or indicated users corresponding to at least one of the two or more parties includes:
selecting a response protocol that enables at least one of the two or more parties to access WLAN service via an access point while disabling access by other parties based at least partly on the at least one attribute of the user set of active or indicated users corresponding to at least one of the two or more parties.

15. The system of claim 1, wherein the selecting a response protocol from the one or more response protocols respectively associated with the two or more parties based at least partly on the at least one attribute of the user set of active or indicated users corresponding to at least one of the two or more parties includes:
selecting a response protocol that switches between a general purpose operating mode and a limited purpose operating mode based at least partly on the at least one attribute of the user set of active or indicated users corresponding to at least one of the two or more parties.

16. The system of claim 1, wherein the selecting a response protocol from the one or more response protocols respectively associated with the two or more parties based at least partly on the at least one attribute of the user set of active or indicated users corresponding to at least one of the two or more parties includes:
selecting a response protocol that specifies at least one of enablement or disablement of at least one of incoming or outgoing communications associated with the mobile device based at least partly on at least one of face recognition or voice recognition of information sensed by the mobile device.

17. The system of claim 1, wherein the mobile device includes:
at least one of a mobile phone, a multimode cellular device, a TDMA device, a GSM device, a spread spectrum device, a CDMA device, a OFDM WiLAN device, a WiFi system device, an internet device, a speakerphone, a speaker, a display device, a video conference unit, a digital television, or a mobile television.

18. The system of claim 1, wherein at least one of the first communication data or the second communication data includes:
at least one of a telephone call, a text message, a video call, audio data content, image data content, video streaming data content, video teleconferencing data content, or streaming multimedia content.

19. A system comprising:
circuitry configured for associating a real destination device identifier and one or more virtual device identifiers corresponding to the real destination device identifier with a mobile device including at least configuring the mobile device to be shared by two or more parties corresponding to two or more human beings wherein configuring the mobile device includes obtaining from at least one party of the two or more parties corresponding to two or more human beings the real device identifier, the one or more virtual device identifiers, and one or more response protocols respectively associated with the two or more parties, the one or more response protocols specifying at least one of enablement or disablement of at least one of incoming or outgoing communications associated with the mobile device;
circuitry configured for receiving, from at least one communication device, first communication data including a device identifier;
circuitry configured for determining whether the device identifier in the first communication data includes at least one of the real destination device identifier or the one or more virtual device identifiers;
circuitry configured for transmitting, to the mobile device, second communication data including the real destination device identifier and an indication of whether the device identifier in the first communication data includes at least one of the real destination device identifier or the one or more virtual device identifiers;
circuitry configured for obtaining at least one of image data or voice data sensed in a vicinity of the mobile device associated as a real destination device;
circuitry configured for analyzing the at least one of image data or voice data via at least one of face recognition or voice recognition for determining presence of at least one of the two or more parties in the vicinity of the mobile device;
circuitry configured for determining at least one attribute of a user set of active or indicated users corresponding to at least one of the two or more parties based at least partly on the presence of at least one of the two or more parties in the vicinity of the mobile device;

circuitry configured for selecting a response protocol from the one or more response protocols respectively associated with the two or more parties based at least partly on the at least one attribute of the user set of active or indicated users corresponding to at least one of the two or more parties; and circuitry configured for causing, at the mobile device, execution of the selected response protocol.

20. A method comprising:

associating a real destination device identifier and one or more virtual device identifiers corresponding to the real destination device identifier with a mobile device including at least configuring the mobile device to be shared by two or more parties corresponding to two or more human beings wherein configuring the mobile device includes obtaining from at least one party of the two or more parties corresponding to two or more human beings the real device identifier, the one or more virtual device identifiers, and one or more response protocols respectively associated with the two or more parties, the one or more response protocols specifying at least one of enablement or disablement of at least one of incoming or outgoing communications associated with the mobile device;

receiving, from at least one communication device, first communication data including a device identifier;

determining whether the device identifier in the first communication data includes at least one of the real destination device identifier or the one or more virtual device identifiers;

transmitting, to the mobile device, second communication data including the real destination device identifier and an indication of whether the device identifier in the first communication data includes at least one of the real destination device identifier or the one or more virtual device identifiers;

obtaining at least one of image data or voice data sensed in a vicinity of the mobile device associated as a real destination device;

analyzing the at least one of image data or voice data via at least one of face recognition or voice recognition for determining presence of at least one of the two or more parties in the vicinity of the mobile device;

determining at least one attribute of a user set of active or indicated users corresponding to at least one of the two or more parties based at least partly on the presence of at least one of the two or more parties in the vicinity of the mobile device;

selecting a response protocol from the one or more response protocols respectively associated with the two or more parties based at least partly on the at least one attribute of the user set of active or indicated users corresponding to at least one of the two or more parties; and causing, at the mobile device, execution of the selected response protocol.

* * * * *